(12) United States Patent
Thayer et al.

(10) Patent No.: US 12,166,227 B1
(45) Date of Patent: Dec. 10, 2024

(54) BATTERY PACK ENCLOSURE

(71) Applicant: Rivian IP Holdings, LLC, Irvine, CA (US)

(72) Inventors: Brandon Thayer, Mission Viejo, CA (US); Ryan Arens, Irvine, CA (US); Tripur Udhav Mahajan, Irvine, CA (US); Michael Ryan Tillapaugh, Rancho Mission Viejo, CA (US); Steven David Lent, Plymouth, MI (US); Andrew Robert Krasts, San Clemente, CA (US); Casey Taylor Dunn, Mission Viejo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/527,189

(22) Filed: Dec. 1, 2023

Related U.S. Application Data

(60) Provisional application No. 63/511,609, filed on Jun. 30, 2023.

(51) Int. Cl.
| | |
|---|---|
| *H01M 50/262* | (2021.01) |
| *B60K 1/04* | (2019.01) |
| *B60L 50/60* | (2019.01) |
| *B60L 50/64* | (2019.01) |
| *B60N 2/005* | (2006.01) |
| *H01M 50/204* | (2021.01) |

(Continued)

(52) U.S. Cl.
CPC ............ *H01M 50/262* (2021.01); *B60K 1/04* (2013.01); *B60L 50/64* (2019.02); *B60L 50/66* (2019.02); *B60N 2/005* (2013.01); *H01M 50/204* (2021.01); *H01M 50/24* (2021.01); *H01M 50/249* (2021.01); *H01M 50/271* (2021.01); *H01M 50/296* (2021.01); *B60K 2001/0422* (2013.01); *B60K 2001/0433* (2013.01); *H01M 2200/103* (2013.01); *H01M 2220/20* (2013.01)

(58) Field of Classification Search
CPC .. H01M 50/262; H01M 50/204; H01M 50/24; H01M 50/249; H01M 50/271; H01M 50/296; H01M 2200/103; H01M 2220/20; B60K 1/04; B60K 2001/0422; B60K 2001/0433; B60L 50/64; B60L 50/66; B60N 2/005
See application file for complete search history.

(56) References Cited

U.S. PATENT DOCUMENTS

| | | | |
|---|---|---|---|
| 8,828,577 B2 * | 9/2014 | Youngs | B60L 58/21 |
| | | | 429/120 |
| 10,186,737 B2 | 1/2019 | Iqbal et al. | |

(Continued)

*Primary Examiner* — Michael L Dignan
(74) *Attorney, Agent, or Firm* — BAKERHOSTETLER

(57) ABSTRACT

Aspects of the disclosure relate to an enclosure for a battery pack. The enclosure may include one or more casted portions, such as a casted front member and a casted rear member. The casted portions may provide benefits including reducing a number of seal paths on the enclosure, facilitating serviceability of various electrical components from a bottom of the battery pack, reducing a number of parts of the enclosure, facilitating efficient battery pack assembly, facilitating connector placement for ergonomics and/or damage protection, facilitating placement of vents, providing casted in lid, lung, and/or skid plate attachments, and/or improving strike reinforcement features.

10 Claims, 28 Drawing Sheets

(51) Int. Cl.
    *H01M 50/24*     (2021.01)
    *H01M 50/249*    (2021.01)
    *H01M 50/271*    (2021.01)
    *H01M 50/296*    (2021.01)

(56) References Cited

U.S. PATENT DOCUMENTS

| | | |
|---|---|---|
| 11,565,579 B2 | 1/2023 | Kellner et al. |
| 11,679,685 B2 | 6/2023 | Sevak et al. |
| 2018/0123100 A1* | 5/2018 | Fees .......................... B60S 5/06 |
| 2019/0140228 A1* | 5/2019 | Handley ............. H01M 10/625 |
| 2020/0152937 A1* | 5/2020 | Sekar .................. H01M 50/271 |
| 2022/0212531 A1* | 7/2022 | Klomberg .............. B62D 21/15 |
| 2023/0054789 A1 | 2/2023 | Zeiler et al. |
| 2023/0084361 A1* | 3/2023 | Wang .................. H01M 50/284 |
| | | 429/163 |

* cited by examiner

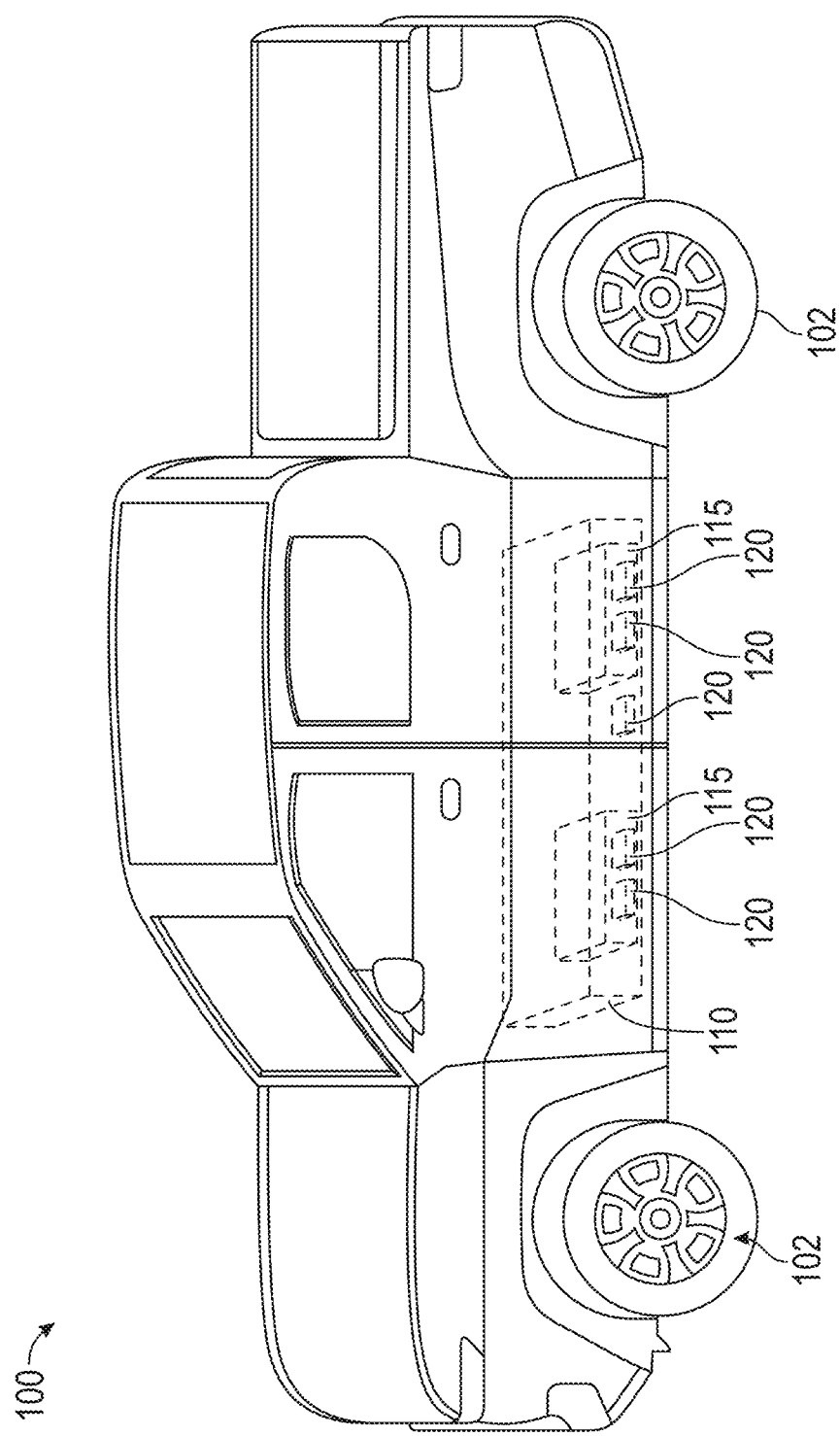

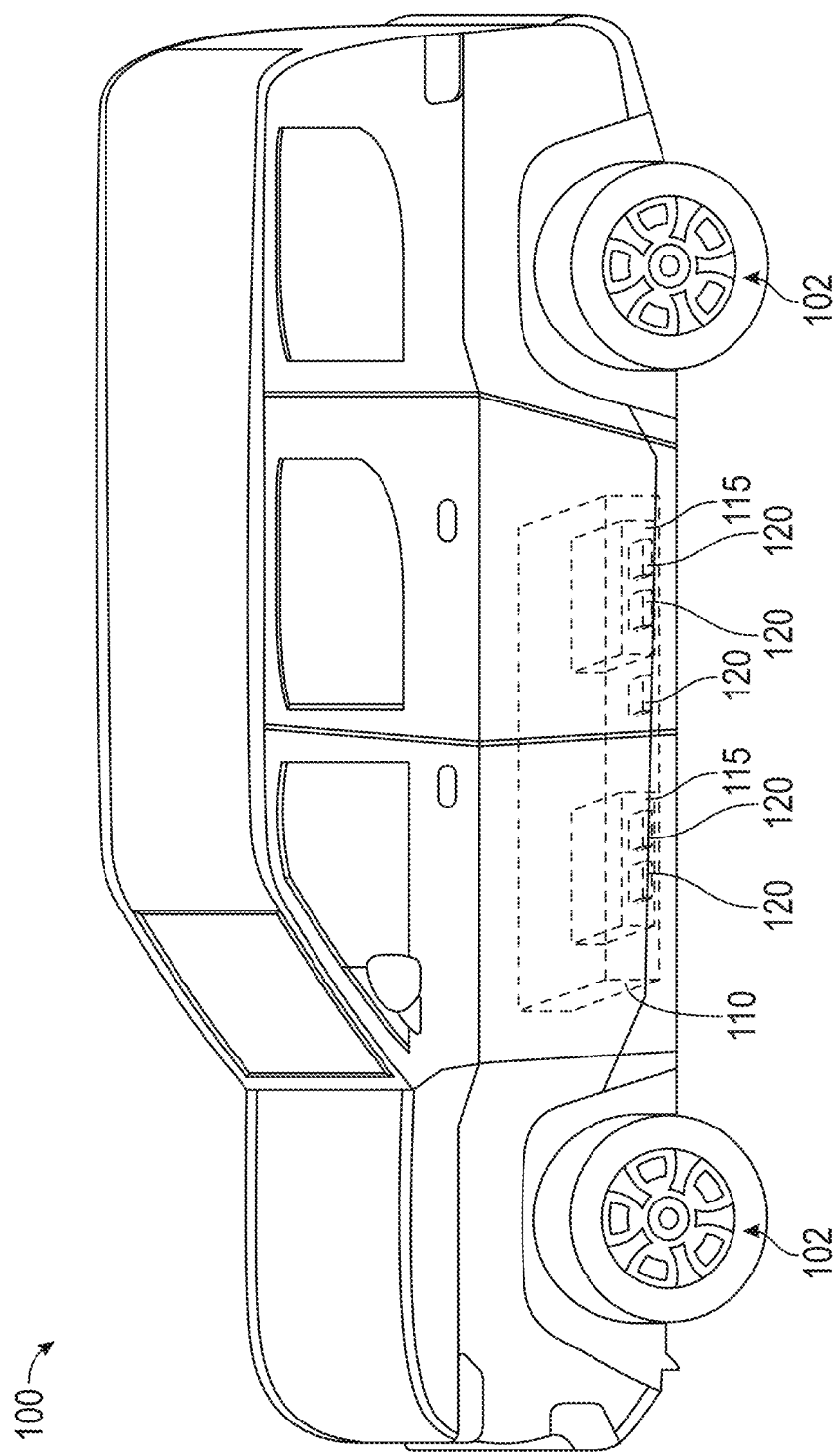

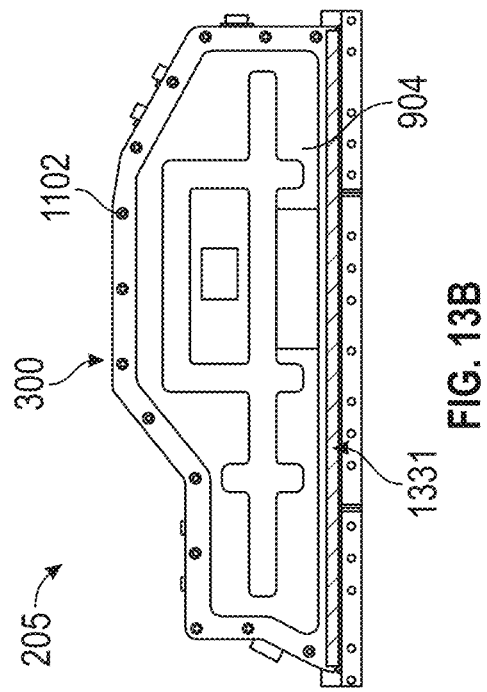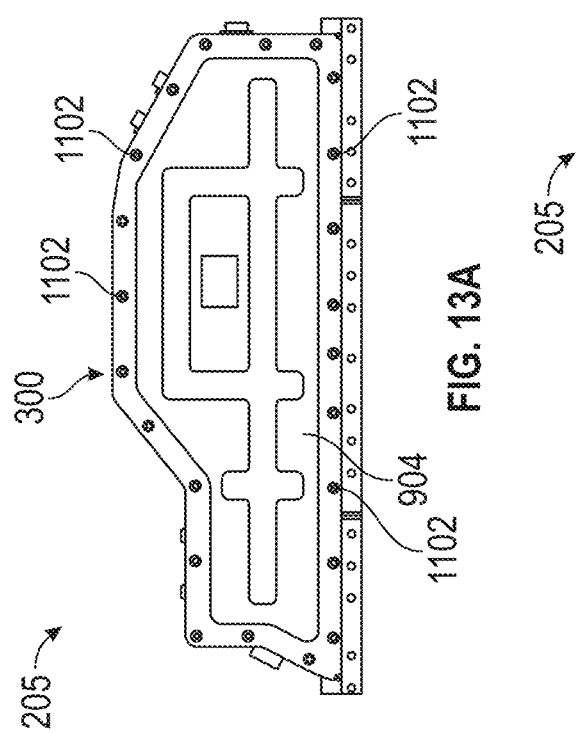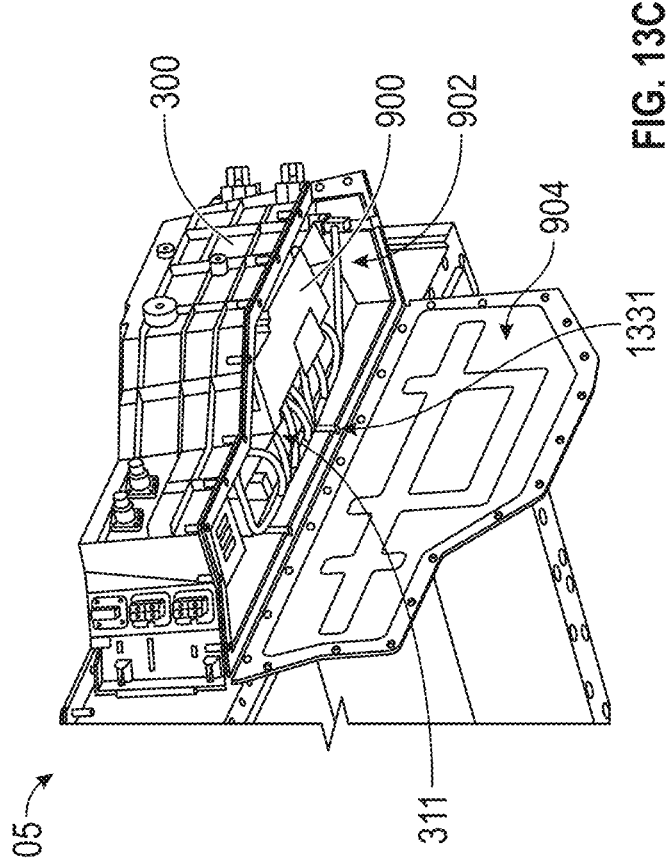
FIG. 13A
FIG. 13B
FIG. 13C

3000

3002
Obtain a first cell carrier for battery cells and a second cell carrier for the battery cells, the first cell carrier including a first plurality of ribs extending from a first sidewall of the first cell carrier, and the second cell carrier including a second plurality of ribs extending from a second sidewall of the second cell carrier

3004
Arrange the first cell carrier and the second cell carrier such that the first plurality of ribs extend toward the second plurality of ribs

3006
Provide a cross member between the first cell carrier and the second cell carrier, such that a first plurality of notches on a first edge of the cross member receive the first plurality of ribs and a second plurality of notches on a second edge of the cross member receive the second plurality of ribs

3102
Receive an impact to a body of a vehicle having a battery pack that includes a cell carrier having a plurality of gussets that extend from a sidewall thereof

3104
Distribute, by the plurality of gussets, at least a portion of a force of the impact away from a plurality of battery cells in the cell carrier and to a cross member having a plurality of notches in which the plurality of gussets are disposed

FIG. 31

BATTERY PACK ENCLOSURE

CROSS REFERENCE TO RELATED APPLICATIONS

This application claims the benefit of priority to U.S. Provisional Patent Application No. 63/511,609, entitled, "BATTERY SUBASSEMBLY", filed on Jun. 30, 2023, the disclosure of which is hereby incorporated herein in its entirety.

INTRODUCTION

Batteries are often used as a source of power, including as a source of power for electric vehicles that include wheels that are driven by an electric motor that receives power from the battery.

Aspects of the subject technology can help to improve the serviceability, manufacturability, range, and/or proliferation of electric vehicles, which can help to mitigate climate change by reducing greenhouse gas emissions.

SUMMARY

Aspects of the subject disclosure relate to an enclosure for a battery pack, such as a battery pack for an electric vehicle. The subject disclosure includes various serviceability aspects of a battery pack enclosure, including access panels with seals and fasteners, access panels enabling bottom access (e.g., without removing the pack from the vehicle), bottom access to a pyro fuse and/or a mid-pack disconnect, and sealing path reduction.

In accordance with aspects of the subject disclosure, an apparatus is provided that includes a casted member for an enclosure for a battery pack, the enclosure including a top configured to be attached to a vehicle and a bottom opposite the top, the casted member including a first opening configured to receive a pressure release valve and a second opening configured to receive a drive unit connector for a vehicle; a cavity configured to enclose an electrical component that is electrically coupled to one or more battery cells located within the enclosure and outside the cavity, and a third opening configured to provide access to the electrical component from the bottom of the enclosure.

The electrical component may include a high voltage distribution box in the cavity, and wherein the casted member further comprises a second cavity configured to receive a plurality of additional battery cells. The casted member may include a casted front member for the enclosure and may be connectable to a plurality of additional housing structures that combine with the casted member to form the enclosure. The electrical component may include a pyrofuse that is configured to be electrically coupled to the one or more battery cells located within the enclosure and outside the cavity. The casted member may include a casted rear member for the enclosure and may be connectable to a plurality of additional housing structures that combine with the casted member to form the enclosure.

The casted member may include: a plurality of bore holes configured to receive a plurality of respective fasteners for securing a cover plate to the casted member over the third opening, the cover plate being removable and/or hingedly openable to expose the third opening; and an outer surface configured to receive a sealing material when the cover plate is fastened to the casted member.

In accordance with other aspects of the subject disclosure, an apparatus is provided that includes a casted member for an enclosure for a battery pack, the casted member including a first opening configured to receive a pressure release valve and a second opening configured to receive a drive unit connector for a vehicle. The casted member may be configured to sealingly attach to each of a plurality of housing structures that combine with the casted member to form the enclosure. The casted member may include a first end surface that is configured to be sealingly welded to a first sidewall for the enclosure, and a second end surface that is configured to be sealingly welded to a second sidewall for the enclosure.

The casted member may include a top edge surface configured to receive a continuous bead of sealing material for sealing the top edge surface to a lid for the enclosure. The casted member may include a plurality of blind bosses configured to receive a plurality of respective fasteners for fastening external components to the casted member without forming leak paths into the enclosure at the plurality of respective fasteners.

The casted member may also include a plurality of bore holes at a plurality of locations each outward of the continuous bead of sealing material, each of the bore holes configured to receive a fastener for fastening a lid of the enclosure to the casted member. The casted member may be implemented in the enclosure and the continuous bead of sealing material may run continuously along the top edge surface of the casted member, a top surface of a first sidewall of the enclosure, a top surface of a rear casted member of the enclosure, and a top surface of a second sidewall of the enclosure.

The enclosure may include one or more features thereon that are configured to support one or more seats of an electric vehicle. The casted member may be formed from a first material having a first coefficient of thermal expansion, and the casted member may be configured to attach to a housing structure to form the enclosure. The housing structure may be formed from a second material having the first coefficient of thermal expansion. The casted member may be formed from a single unitary structure.

In accordance with other aspects of the subject disclosure, an apparatus is provided that includes a cell carrier configured to receive a plurality of battery cells. The cell carrier may include at least one sidewall having a plurality of ribs that extend outward from an exterior of the at least one sidewall, the plurality of ribs configured to distribute at least a portion of an impact force on the cell carrier away from the plurality of battery cells. The at least one sidewall and the plurality of ribs may be integrally formed parts of a common unitary structure.

Each of the plurality of ribs may include a gusset that extends perpendicularly from the at least one sidewall to a flange that extends outward from a base of the at least one sidewall perpendicularly to the at least one sidewall and to each of the plurality of ribs. Each of the plurality of ribs may extend\ from the at least one sidewall to a first distance at the flange, and taper, moving vertically away from the flange, toward the at least one sidewall.

The plurality of ribs may be configured to be received by a plurality of corresponding notches in a cross member disposed between the cell carrier and another cell carrier, and to distribute at least some of the portion of the impact force to the cross member. The cell carrier may be implemented in a battery subassembly in a vehicle.

In accordance with one or more other aspects of the subject disclosure, a method of servicing a battery pack is provided, the method including: exposing an opening in a bottom surface of a casted member of an enclosure for a battery pack; servicing an electrical component of the battery pack via the opening in the casted member; and returning the battery pack to service. Exposing the opening may include removing or hingedly opening the cover plate by removing a plurality of fasteners along one or more edges of the cover plate, and breaking a seal between the cover plate and the bottom surface. Removing or hingedly opening the cover plate may include removing or hingedly opening the cover plate while the battery pack is installed in a vehicle, and servicing the electrical component may include replacing or repairing the electrical component while the battery pack is installed in the vehicle.

The electrical component may include a high voltage distribution box and returning the battery pack to service may include reconnecting a terminal of the battery pack to drive unit of the vehicle. The method may also include servicing a battery module of the battery pack from an additional opening in the bottom surface of the casted member.

BRIEF DESCRIPTION OF THE DRAWINGS

Certain features of the subject technology are set forth in the appended claims. However, for purpose of explanation, several embodiments of the subject technology are set forth in the following figures.

FIGS. 1A and 1B illustrate schematic perspective side views of example implementations of a vehicle having a battery pack in accordance with one or more implementations.

FIG. 13A illustrates a bottom view of a portion of an enclosure for a battery pack, the enclosure including a removable cover plate for bottom access to an electrical component in accordance with one or more implementations.

FIGS. 13B and 13C illustrate a bottom view and a perspective view, respectively, of a portion of an enclosure for a battery pack, the enclosure including a hinged cover plate for bottom access to an electrical component in accordance with one or more implementations.

FIG. 30 is a flow chart of illustrative operations that may be performed for assembling a battery pack in accordance with one or more implementations.

FIG. 31 is a flow chart of illustrative operations that may be performed for impact management for a vehicle in accordance with one or more implementations.

DETAILED DESCRIPTION

Figure 1C:
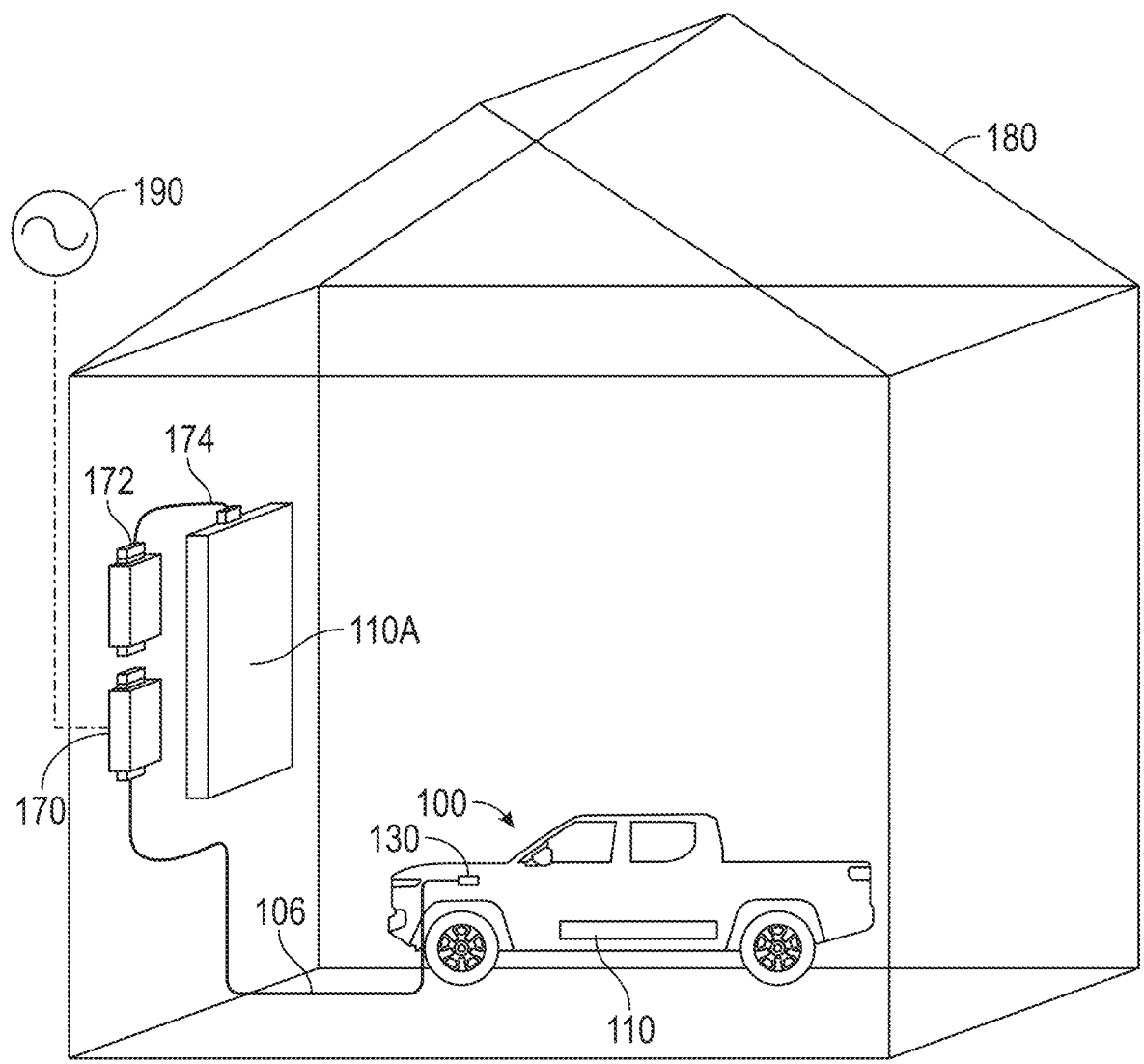
FIG. 1C illustrates a schematic perspective view of a building having a battery pack in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology described herein relate to an enclosure for a battery pack, such as battery pack for electric vehicles. In one or more implementations, the enclosure may include one or more casted members. The casted member(s) may provide for a number of functions at the front and/or rear of the battery pack, integrated into a single component. This can result in significant cost, mass, and/or manufacturing process improvements (e.g., in comparison with front and/or rear portions of a battery pack that are formed from multiple separate components for the various functions).

FIG. 1A is a diagram illustrating an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid).

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

For example, the battery cell 120 can be included a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
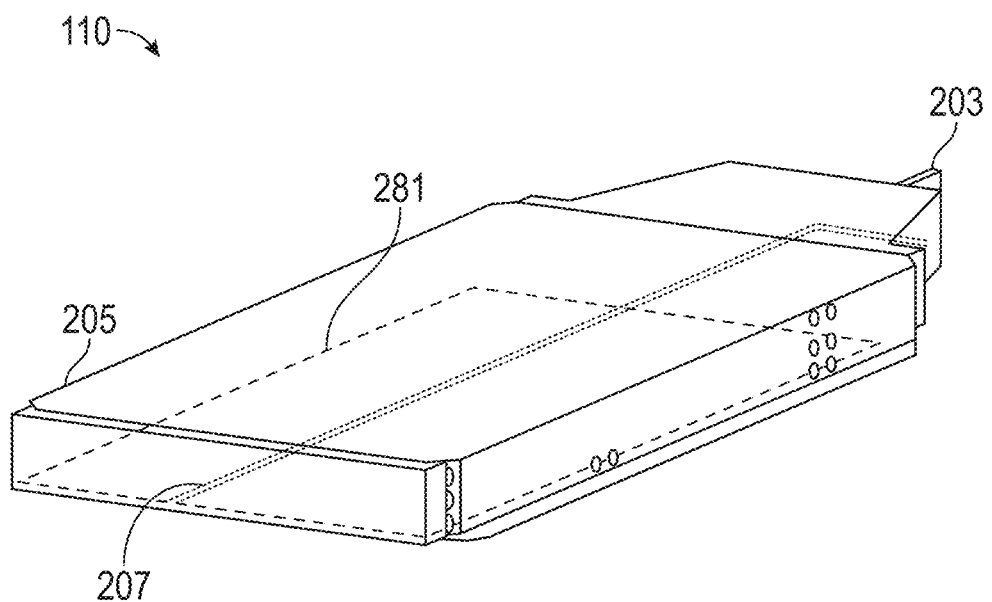
FIG. 2A illustrates a schematic perspective view of a battery pack in accordance with one or more implementations.

FIG. 2A depicts an example battery pack 110. Battery pack 110 may include multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within an enclosure 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include an enclosure 205 (e.g., also referred to as a battery pack housing or pack frame). For example, the enclosure 205 may house or enclose one or more battery modules 115 and/or one or more battery cells 120, and/or other battery pack components. In one or more implementations, the enclosure 205 may include or form a shielding structure, such as a skid plate, on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the enclosure 205, such as by distributing fluid through the battery pack 110.

For example, the thermal control structures 207 may form a part of a thermal/temperature control or heat exchange system that includes one or more thermal components 281 such as plates or bladders that are disposed in thermal contact with one or more battery modules 115 and/or battery cells 120 disposed within the enclosure 205. For example, a thermal component 281 may be positioned in contact with one or more battery modules 115, battery units, batteries, and/or battery cells 120 within the enclosure 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
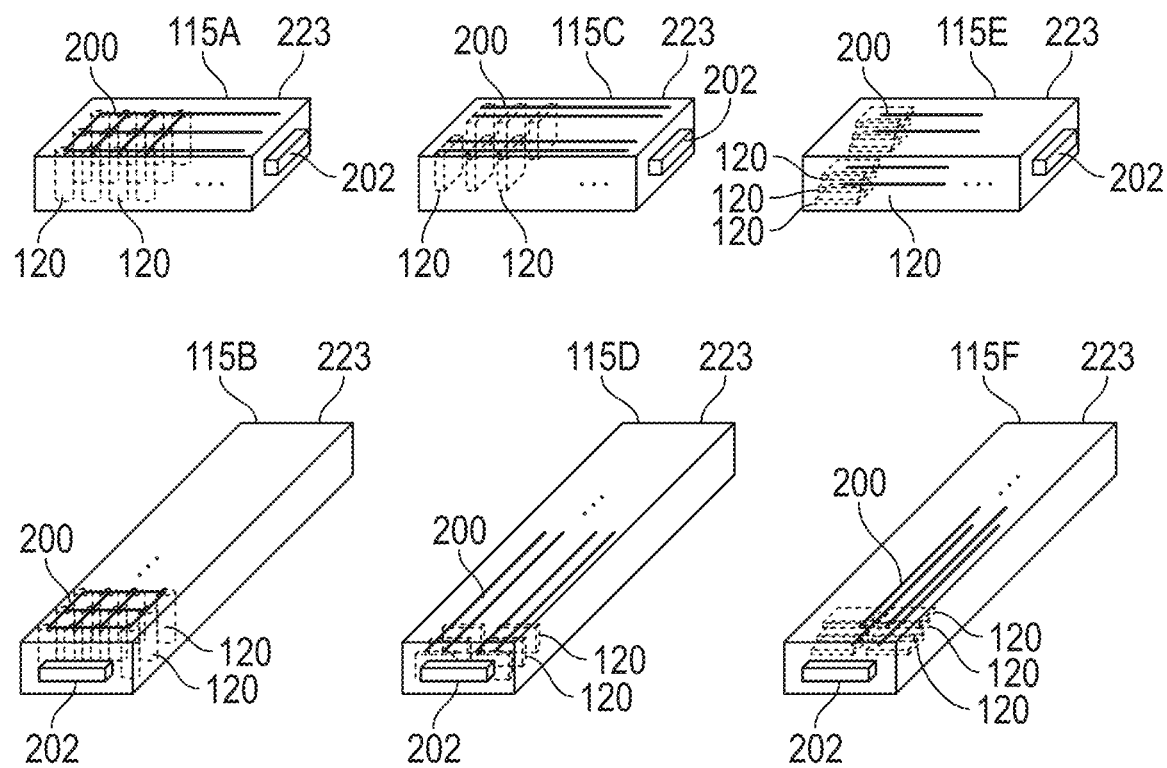
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the enclosure 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the enclosure 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the enclosure 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the enclosure 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the enclosure 205) may include or define a plurality of structures for positioning of the battery cells 120 directly within the enclosure 205.

Figure 2C:
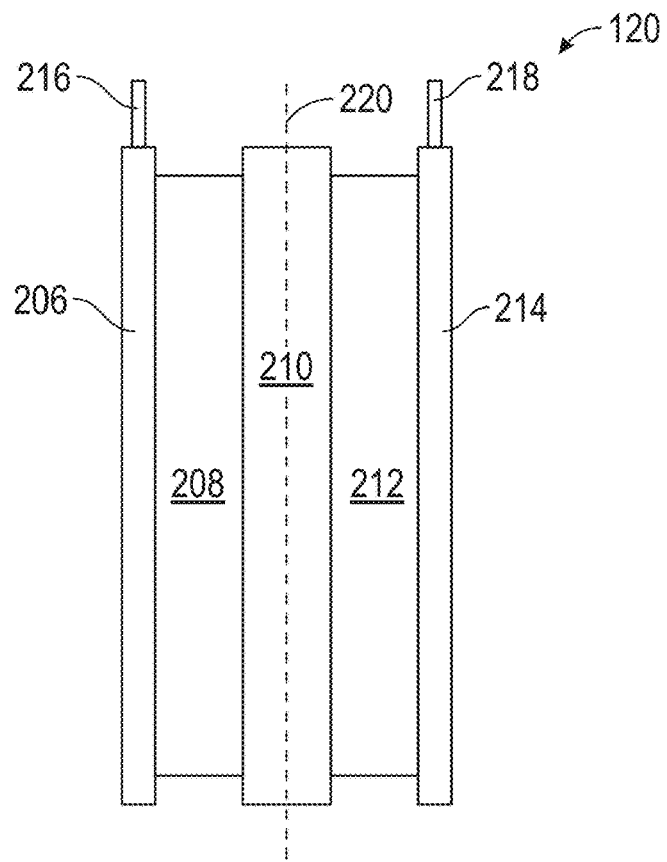
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, sodium ion battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials.

Figure 2D:
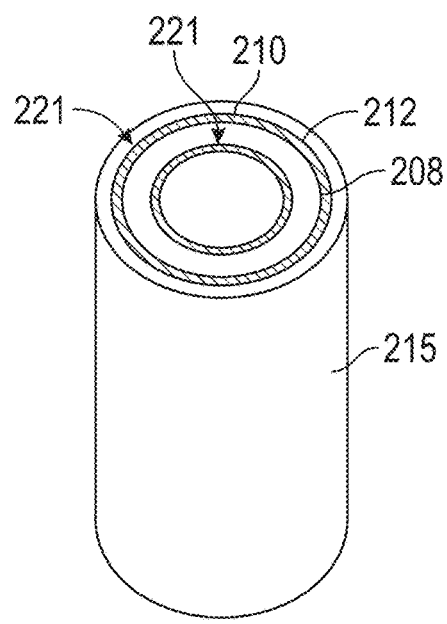
FIG. 2D illustrates a cross-sectional perspective view of a cylindrical battery cell in accordance with one or more implementations.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 215 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 215. For example, a separator layer may be disposed between adjacent ones of the windings 221. However, the cylindrical cell implementation of FIG. 2D is merely illustrative, and other implementations of the battery cells 120 are contemplated.

Figure 2E:
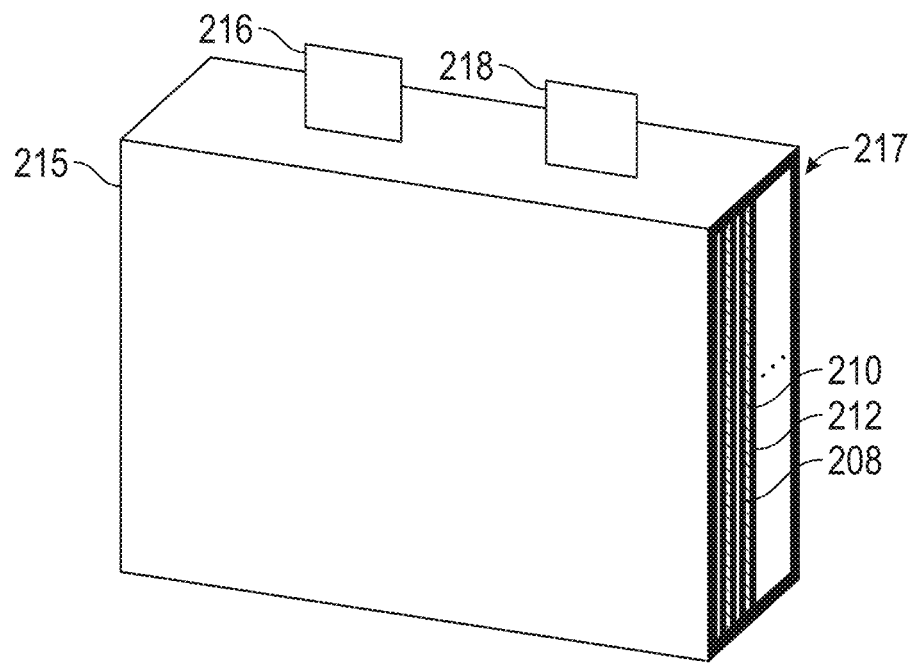
FIG. 2E illustrates a cross-sectional perspective view of a prismatic battery cell in accordance with one or more implementations.

For example, FIG. 2E illustrates an example in which the battery cell 120 is implemented as a prismatic cell. As shown in FIG. 2E, the battery cell 120 may have a cell housing 215 having a right prismatic outer shape. As shown, one or more layers of the anode 208, the cathode 212, and the electrolyte 210 disposed therebetween may be disposed (e.g., with separator materials between the layers) within the cell housing 215 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 215 having the right prismatic shape. In the implementation of FIG. 2E, the cell housing 215 has a relatively thick cross-sectional width 217 and is formed from a rigid material. For example, the cell housing 215 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 215 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 215 (e.g., a glass to metal feedthrough) as the conductor passes through to cell housing 215 to expose the first terminal 216 and the second terminal 218 outside the cell housing 215 (e.g., for contact with an interconnect structure 200 of FIG. 2B). However, this implementation of FIG. 2E is also illustrative and yet other implementations of the battery cell 120 are contemplated.

Figure 2F:
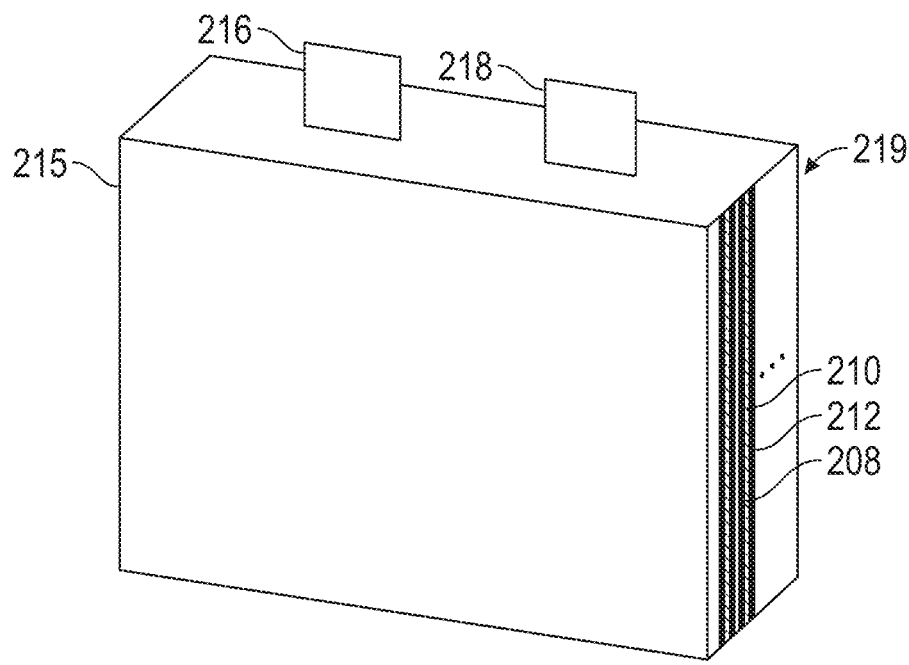
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 215 that forms a flexible or malleable pouch housing. In the implementation of FIG. 2F, the cell housing 215 has a relatively thin cross-sectional width 219. For example, the cell housing 215 in the implementation of FIG. 2F may be formed from a flexible or malleable material (e.g., a foil, such as a metal foil, or film, such as an aluminum-coated plastic film). For example, the cross-sectional width 219 of the cell housing 215 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 215 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 215 of the battery cell 120 can be disposed in the battery module 115, the battery pack 110, or installed in any of the vehicle 100, the building 180, or any other electrically powered component or device.

Figure 3:
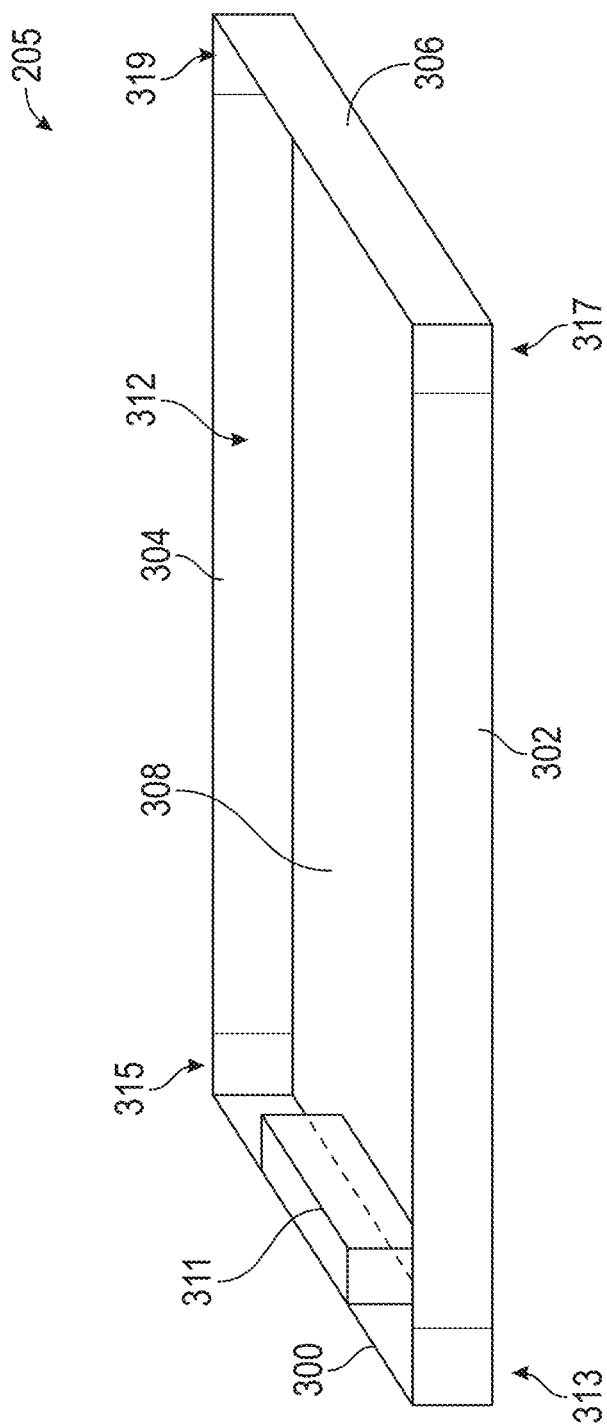
FIG. 3 illustrates a perspective view of an enclosure for a battery pack in accordance with one or more implementations.

FIG. 3 illustrates an schematic perspective view of an enclosure 205 for the battery pack 110. In this example, the enclosure 205 may include a casted member 300, an extruded sidewall structure 302 (e.g., a first siderail or extruded sidewall), an extruded sidewall structure 304 (e.g., a second siderail or extruded sidewall), a casted member 306, and a bottom plate 308. For example, the casted member 300 may be a monolithic, unitary member that has been formed from, for example, metal (e.g., aluminum, steel, another metal, and/or an alloy thereof) in a casting operation (e.g., a die casting operation). The casted member 300 may be a casted front member for the enclosure 205, configured for positioning near or toward a front of a vehicle in which battery pack 110 is installed. For example, the casted member 300 may form a front wall of the enclosure 205, and may have an outer surface that defines the front surface of the enclosure 205 and the battery pack 110. As shown, the casted member 300 may include end portions 313 and 315 (e.g., corner portions) that bend way from the front wall to form respective portions of respective sidewalls of the enclosure 205.

The casted member 306 may be a monolithic, unitary member that has been formed from, for example, metal (e.g., aluminum, steel, another metal, and/or an alloy thereof) in a casting operation (e.g., a die casting operation). The casted member 306 may be a casted rear member for the enclosure 205, configured for positioning near or toward a rear of a vehicle in which battery pack 110 is installed. For example, the casted member 306 may form a rear wall of the enclosure 205, and may have an outer surface that defines the rear surface of the enclosure 205 and the battery pack 110. As shown, the casted member 306 may include end portions 317 and 319 (e.g., corner portions) that bend way from the rear wall to form respective portions of the respective sidewalls of the enclosure 205. The end portions 313 and 315 of the casted member 300, and the end portions 317 and 319 of the casted member 306, may allow the extruded sidewall structure 302 and the extruded sidewall structure 304 to be substantially linear sidewall structures that each extend along a substantially straight path between the casted member 300 and the casted member 306.

As shown, the casted member 300 may include and/or define a cavity 311. As described in further detail hereinafter, the cavity 311 may be configured to enclose electrical circuitry, such as a high voltage distribution box (HVDB) that is electrically coupled to one or more battery modules 115 and/or battery cells 120 of the battery pack 110. For example, the battery modules 115 and/or battery cells 120 may be enclosed in an additional cavity 312, separate from the cavity 311, defined in part by the extruded sidewall structure 302 and the extruded sidewall structure 304.

For example, the extruded sidewall structure 302 may be a single monolithic unitary structure that has been formed from, for example, metal (e.g., aluminum, steel, another metal, and/or an alloy thereof) in an extrusion operation. The extruded sidewall structure 304 may be a single monolithic unitary structure that has been formed from, for example, metal (e.g., aluminum, steel, another metal, and/or an alloy thereof) in an extrusion operation.

Figure 4:
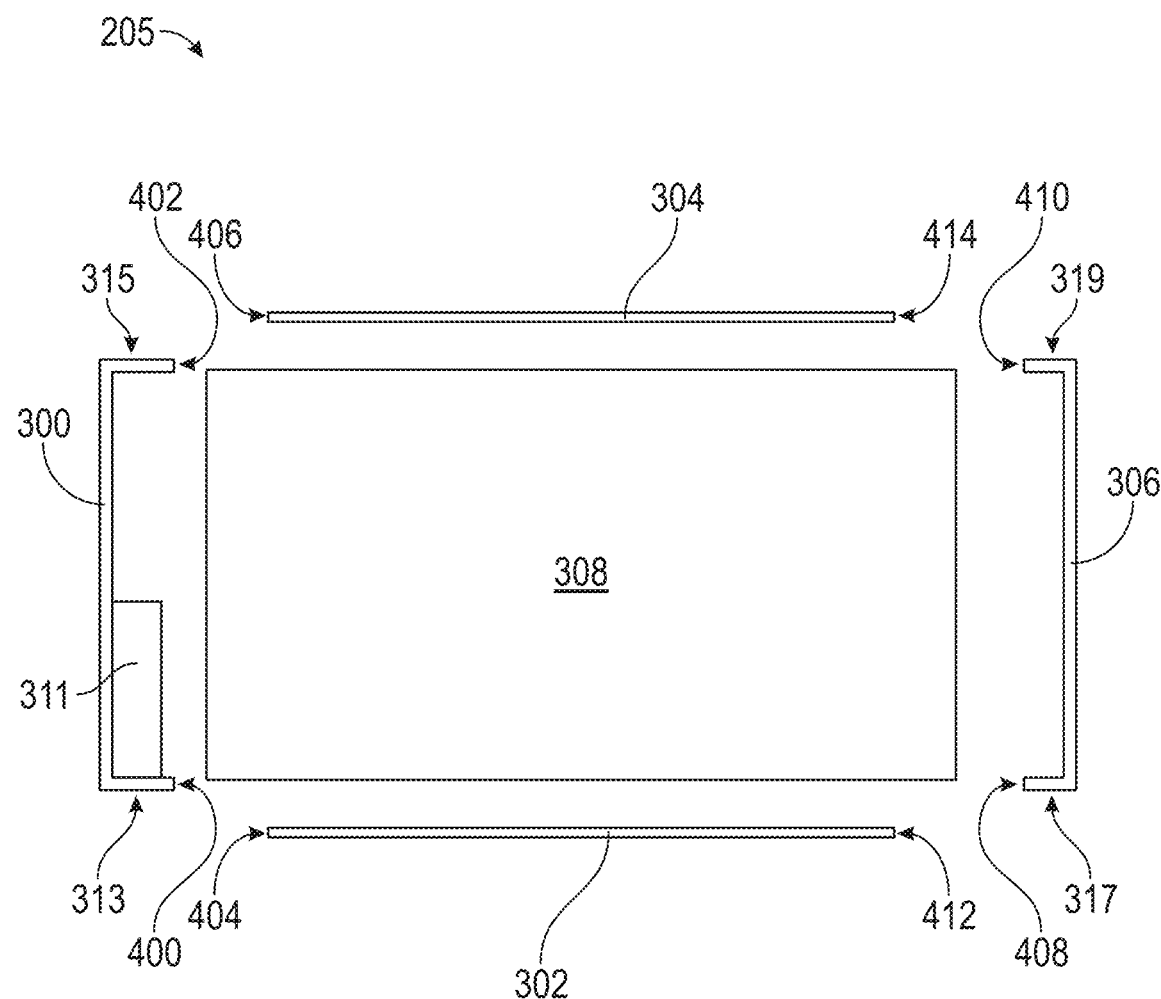
FIG. 4 illustrates an exploded top view of an enclosure for a battery pack in accordance with one or more implementations.

FIG. 4 illustrates an exploded top view of the enclosure 205 of FIG. 3. As shown in FIG. 4, the casted member 300 may include a first end surface 400 configured to be welded to a first end surface 404 of the extruded sidewall structure 302 and a second end surface 402 configured to be welded to a first end surface 406 of the extruded sidewall structure 304. The casted member 306 may include a first end surface 408 configured to be welded to a second end surface 412 of the extruded sidewall structure 302 and a second end surface 410 configured to be welded to a second end surface 414 of the extruded sidewall structure 304. The bottom plate 308 may be attached to (e.g., bottom surfaces of) the casted member 300, the extruded sidewall structure 302, the casted member 306, and the extruded sidewall structure 304 via welding and/or via one or more fasteners such as screws or bolts to form the enclosure 205. In one or more implementations, a lid (not shown in FIGS. 3 and 4) may be attached to (e.g., top surfaces of) the casted member 300, the extruded sidewall structure 302, the casted member 306, and the extruded sidewall structure 304 via welding and/or via one or more fasteners such as screws or bolts to close the enclosure 205 (e.g., after one or more battery modules, battery cells, cooling structures, and/or other electrical, structural, and/or thermal components have been installed in the cavity 312 and/or the cavity 311).

Figure 5:
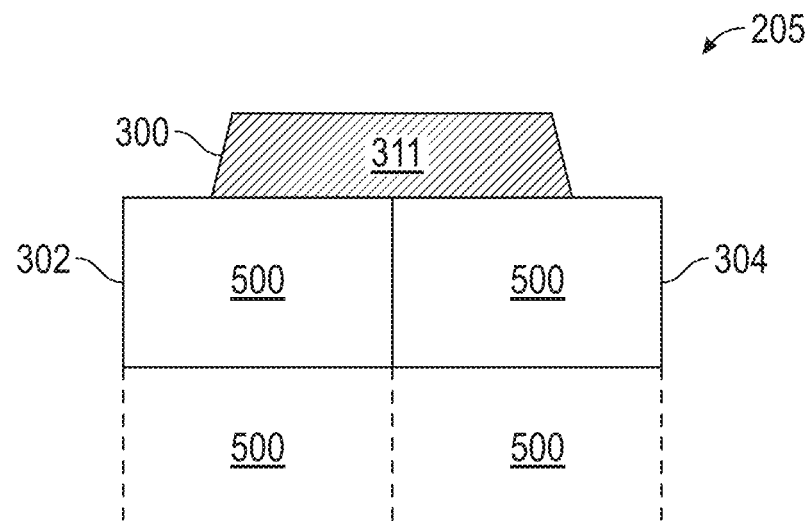
FIG. 5 illustrates a schematic top view of an enclosure for a battery pack with an even number of battery modules in accordance with one or more implementations.
Figure 6:
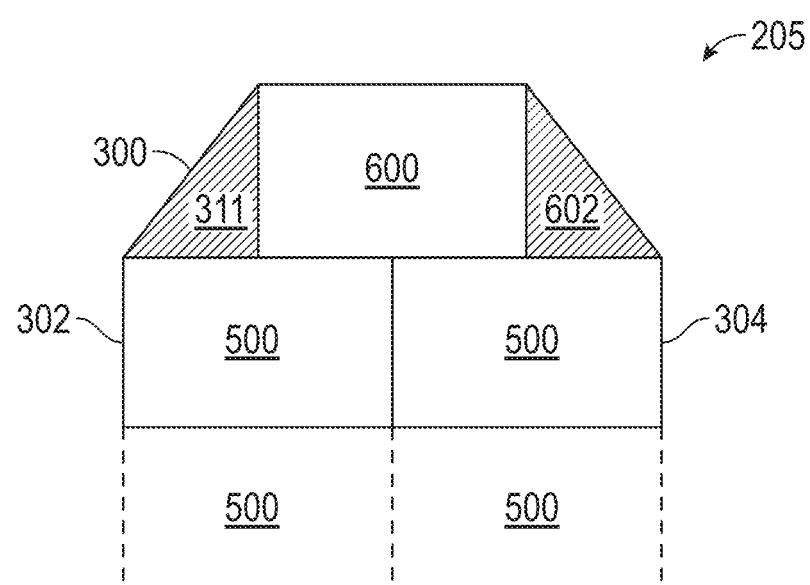
FIG. 6 illustrates a schematic top view of an enclosure for a battery pack with an odd number of battery modules in accordance with one or more implementations.

In various implementations, the enclosure 205 may be arranged to house an even or odd number of battery modules. For example, FIG. 5 illustrates a schematic top view of the enclosure 205 configured for an even number of battery modules. As shown in FIG. 5, the casted member 300 includes the cavity 311 (e.g., for an HVDB and/or other electrical distribution and/or current collection components), without including space for a battery module therewithin. In contrast, FIG. 6 illustrates a schematic top view of the enclosure 205 configured for an odd number of battery modules. As shown in FIG. 6, the casted member 300 may include the cavity 311 (e.g., for an HVDB and/or other electrical distribution and/or current collection components), and may include an additional cavity 600 that is configured to receive a battery module 115. As shown, the casted member 300 in the example of FIG. 6 may also, optionally, include a cavity 602 on an opposite side of the casted member 300 from the cavity 311. The cavity 602 may also be configured to enclose one or more components of the battery pack 110. In each of the examples of FIGS. 5 and 6, the extruded sidewall structures 302 and 304 extend from opposing ends of the casted member 300, and the cavity 312 includes multiple portions 500, each configured to receive a battery modules 115.

Figure 7:
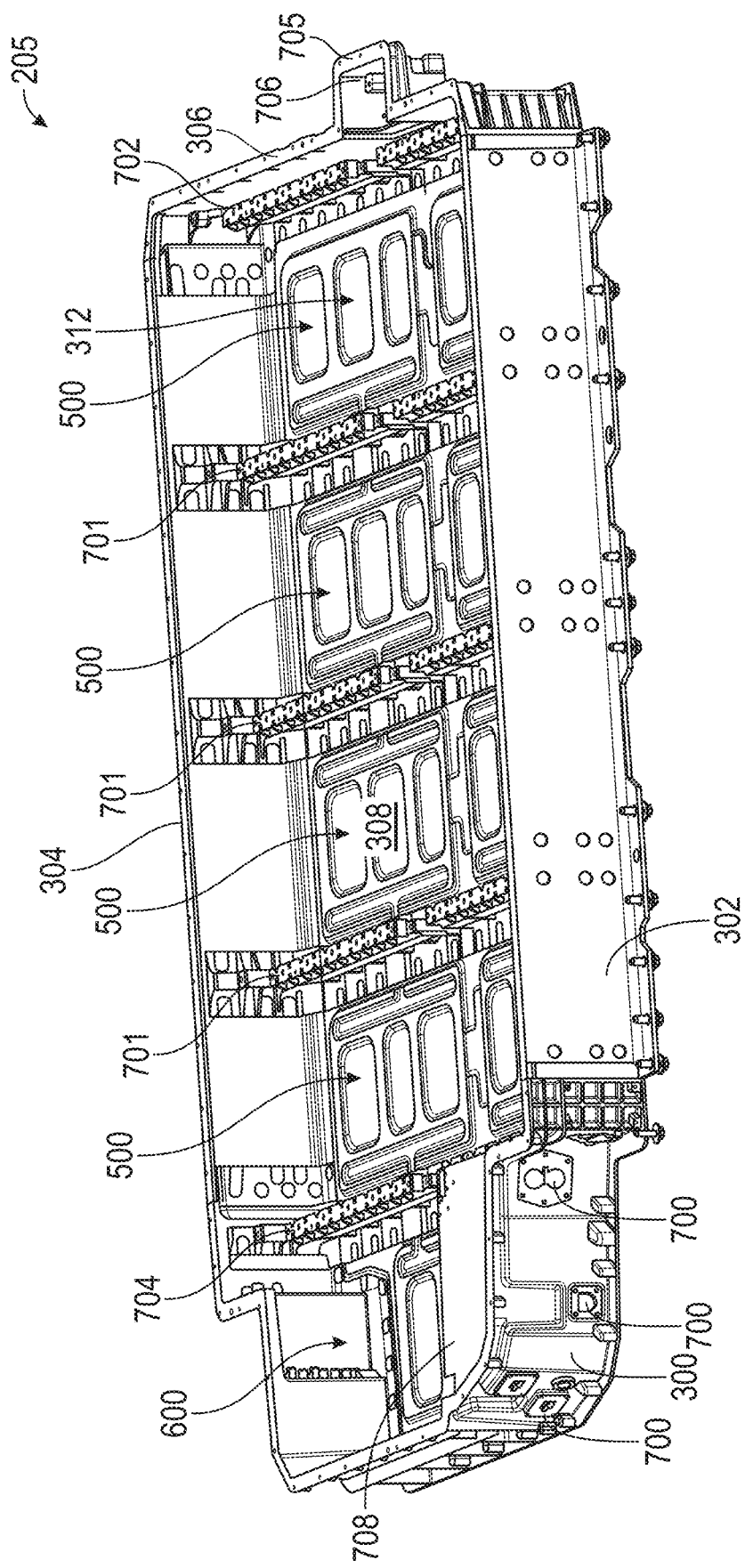
FIG. 7 illustrates a perspective view of an enclosure for a battery pack in accordance with one or more implementations.

FIG. 7 illustrates a top perspective view of the enclosure 205 in an implementation in which the enclosure 205 is configured to hold an odd number (e.g., nine) of battery modules 115, such as in four rows of two battery modules 115, and one battery module 115 in the cavity 600 in the casted member 300. In this example, the casted member 300 in the implementation of FIG. 6 is welded to extruded sidewall structures 302 and 304. In this example, the battery pack 110 includes three mounting structures 701 (e.g., each between a two rows of battery modules). Each of the mounting structures 701 may be used to mount a pair of adjacent battery modules 115 (e.g., and/or a cross member as described in further detail hereinafter). FIG. 7 shows how the casted member 300 may also include various openings 700 (e.g., for vents such as pressure release valves (PRVs), electrical connectors such as drive unit connectors for coupling electrical power from the battery pack to a drive unit of the vehicle 100, fittings for coolant ports, or the like).

FIG. 7 also shows how the casted member 306 may form (or receive) a mounting structure 702 for the two rearmost battery modules 115 and/or for a cross-member mounted thereto. FIG. 7 also shows how the casted member 300 may form (or receive) a mounting structure 704 for the two frontmost battery modules 115 in the cavity 312 and for the battery module 115 mounted in the cavity 600 formed by the casted member 300 (and/or for a cross member mounted thereto). FIG. 7 also shows how the casted member 300 may include an integral wall 708, a portion of which covers the cavity 311 (e.g., and which helps to separate the cavity 311 from the cavity 600 and the cavity 312). FIG. 7 also shows how the casted member 306 may include an extension 705 that defines a cavity 706 in the casted member 306. In one or more implementations, the enclosure assembly of FIG. 7, including the casted member 300, the extruded sidewall structures 302 and 304, the casted member 306, and the bottom plate 308 (e.g., and/or the mounting structures 701, 702, and 704) may be provided, as a five-sided box, to a pack assembly process in which the battery modules 115 (e.g., and additional circuitry such as a high voltage distribution box, one or more pyrofuses, or the like) can be installed, and onto which a lid can be fastened to close the enclosure 205.

Figure 8:
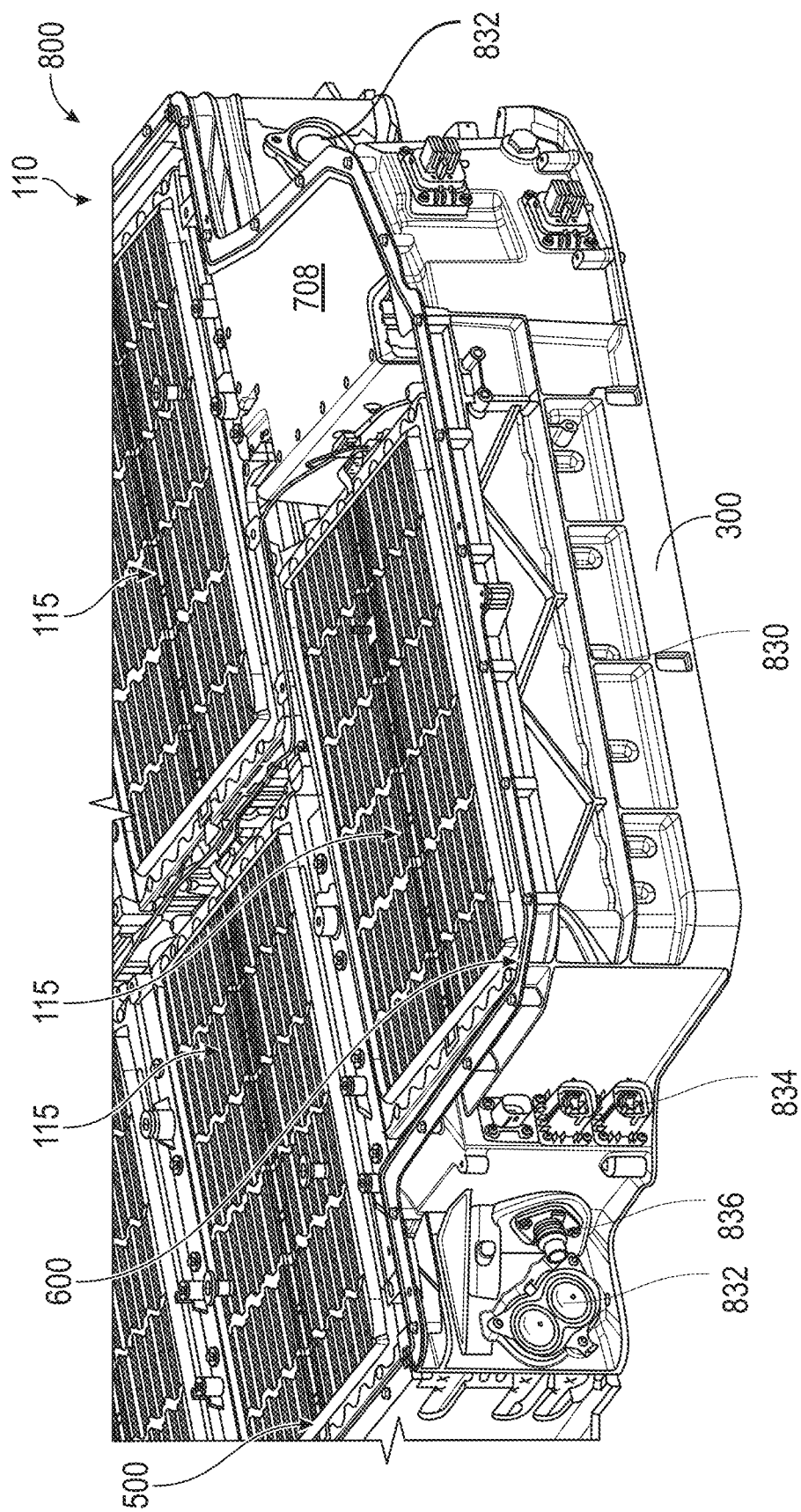
FIG. 8 illustrates a top perspective view of a portion of a battery pack with the enclosure of FIG. 7 in accordance with one or more implementations.

FIG. 8 illustrates a top perspective view of a portion of a battery pack with the enclosure of FIG. 7 in accordance with one or more implementations. In the example of FIG. 8, the battery modules 115 have been installed in the portions 500 of the cavity 312, and in the cavity 600 in the casted member 300. The example of FIG. 8 illustrates a top 800 of the battery pack 110, without a lid of the battery pack installed thereon. The top 800 (e.g., after installation of the lid) may be configured to be attached to a vehicle 100. As shown, the wall 708 may prevent access to the cavity 311 from the top of the battery pack 110. FIG. 8 also illustrates how the casted member 300 may be provided with structural features 830, such as ribs or other reinforcing features. The structural features 830 may provide additional strength for the enclosure 205 and the battery pack 110, providing robustness to external forces (e.g., linear forces, twisting or bending forces, and/or impact forces).

FIG. 8 also illustrates how various components of the battery pack 110 can be installed in the openings (e.g., openings 700 shown in FIG. 7) in the casted member 300. As shown, the battery pack 110 may include one or more venting structures 832, such as pressure release valves (PRVs), installed in one or more openings 700 in the casted member 300, one or more connectors 834, such as drive unit connectors, installed in one or more openings 700 in the casted member 300, and/or one or more fittings 836, such as coolant port fittings, installed in one or more openings 700 in the casted member 300.

Figure 9:
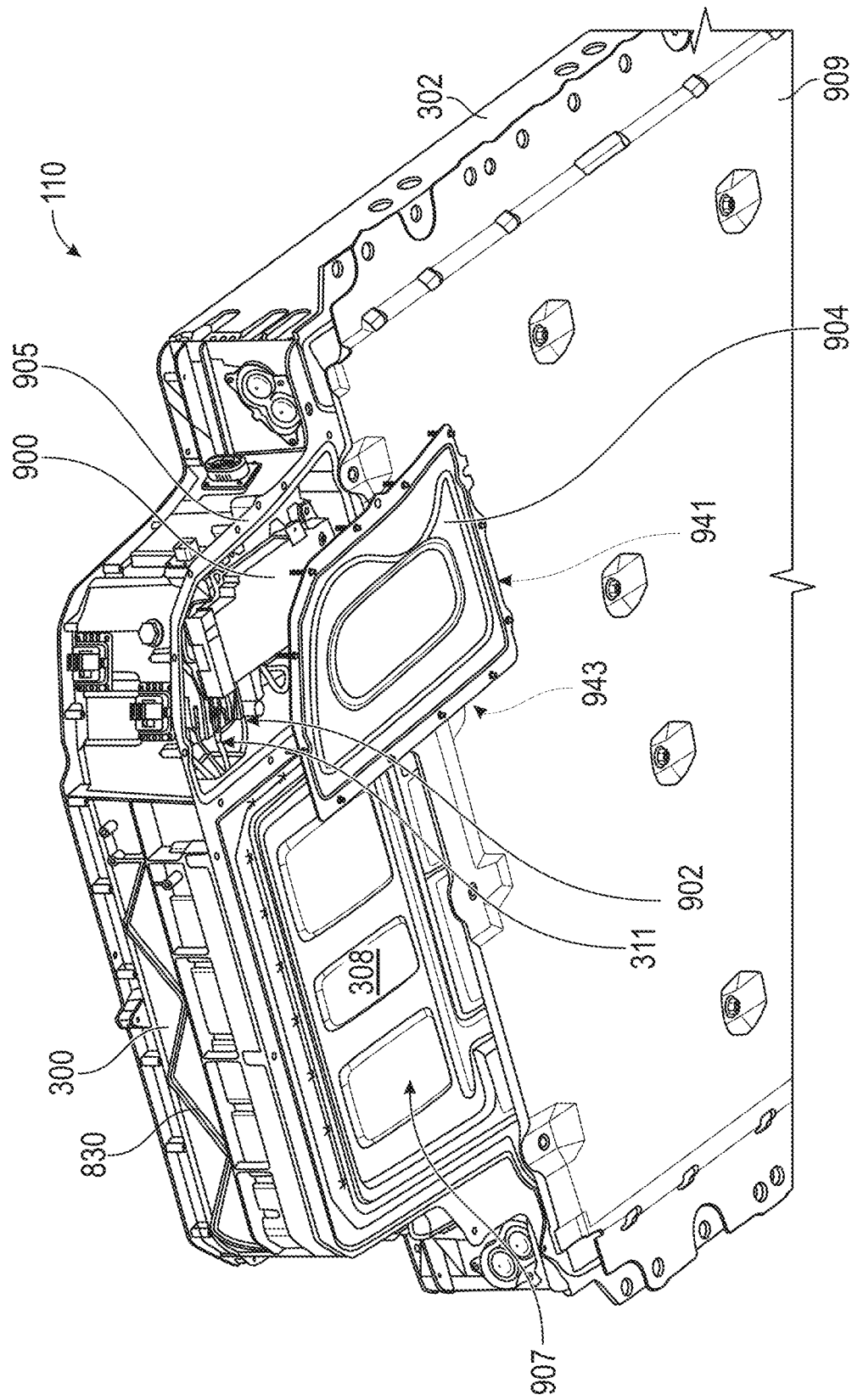
FIG. 9 illustrates a bottom perspective view of a portion of a battery pack with the enclosure of FIG. 7 in accordance with one or more implementations.

FIG. 9 illustrates a bottom perspective view of a portion of a battery pack with the enclosure of FIG. 7 in accordance with one or more implementations. A bottom 907 of the battery pack 110, opposite the top 800 shown in FIG. 8, is visible in FIG. 9. In the example of FIG. 9, a skid plate 909 is attached to a portion of the bottom 907 of the battery pack 110. As shown, the cavity 311 is visible through an opening 902 in the casted member 300 (e.g., in a bottom of the casted member 300). As shown, a high voltage distribution box 900, or HVDB, may be installed within the cavity 311. For example, the high voltage distribution box 900 may include electrical components for control of charging of the battery cells 120 in the battery modules 115, discharging of the battery cells 120 in the battery modules 115, short-circuit protection, current and/or voltage measurements, temperature monitoring, and/or other voltage distribution, control, and/or monitoring circuitry for the battery pack 110.

A cover plate 904 may be attached to a surface 905 of the casted member 300 (e.g., using one or more fasteners received in one or more openings in the surface of the casted member 300), to enclose and/or seal the high voltage distribution box 900 within the cavity 311. The cover plate 904 may be removable or otherwise openable to expose the opening 902 to provide access to the high voltage distribution box 900. In the example of FIG. 9, the cover plate 904 may be completely removable from the bottom 907 of the enclosure 205 (e.g., by removing one or more fasteners that attach the cover plate 904 to the casted member 300). However, in other implementations, the cover plate 904 may be a hinged cover plate that is attached to the casted member 300 with a hinge (e.g., along an edge 941 and/or an edge 943). In this way, the cover plate 904 may be opened by removing one or more fasteners that attach the cover plate 904 to the casted member 300 along one or more other edges of the cover plate 904, and hinging the cover plate open (e.g., via rotation about the hinge). In these other implementations, the hinged edge of the cover plate 904 may remain attached to the casted member 300 in an open or closed position of the cover plate 904.

Because the cover plate 904 is removable and/or openable, the high voltage distribution box 900 can be installed, removed, and/or replaced via the opening 902 in the casted member 300. In this way, the serviceability of the battery pack 110 may be improved. For example, in a scenario in which the high voltage distribution box 900 or another electrical component that is housing in the cavity 311 needs repair or replacement, and in which the battery pack 110 is attached to a vehicle 100, the high voltage distribution box 900 or other electrical component can be removed via the opening 902, repaired and/or replaced in the cavity 311, and the opening 902 can be reclosed by reattaching and/or hingedly closing the cover plate 904 while the battery pack 110 remains attached to the vehicle 100 (e.g., in contrast with removing the entire battery pack 110 from the vehicle 100, and opening the lid to the entire battery pack from the top 800 to access the high voltage distribution box 900).

As shown in FIGS. 8 and 9, the casted member 300 may be a single, unitary structure that may be free of external pouches and/or pockets (e.g., for housing additional electrical components of the battery pack) that are welded to the external surface of the casted member, in one or more implementations. In the example of FIG. 9, the bottom plate 308 is depicted as covering the bottom surface of the cavity 600 within which battery cells (e.g., within a battery module 115 as in FIG. 8, or directly installed in the cavity 600) are installed. However, in one or more other implementations, an additional removable and/or openable (e.g., hinged) cover plate may be provided over the portion of the bottom surface of the cavity 600 in the casted member 300 within which battery cells are installed, thereby allowing the battery cells (e.g., within a battery module 115 as in FIG. 8, or directly installed in the cavity 600) that are installed in the cavity 600 in the casted member 300 to be replaced and/or repaired from the bottom of the battery pack (e.g., while the battery pack is attached to and/or installed in a vehicle or other apparatus). In one or more implementations, a single removable and/or openable (e.g., hinged) cover plate may be provided on the bottom 907 of the enclosure that can be removed and/or opened to provide access to both the battery cells (e.g., battery module 115) installed in the cavity 600 and the HVDB 900 installed in the cavity 311. In various other implementations, one hinged cover plate may be provided on the bottom of the enclosure 205 for access to the HVDB 900, or two hinged cover plates 904 may be provided, one for access the battery module 115 in the cavity 600, and one for access to the HVDB 900 in the cavity 311.

Figure 10:
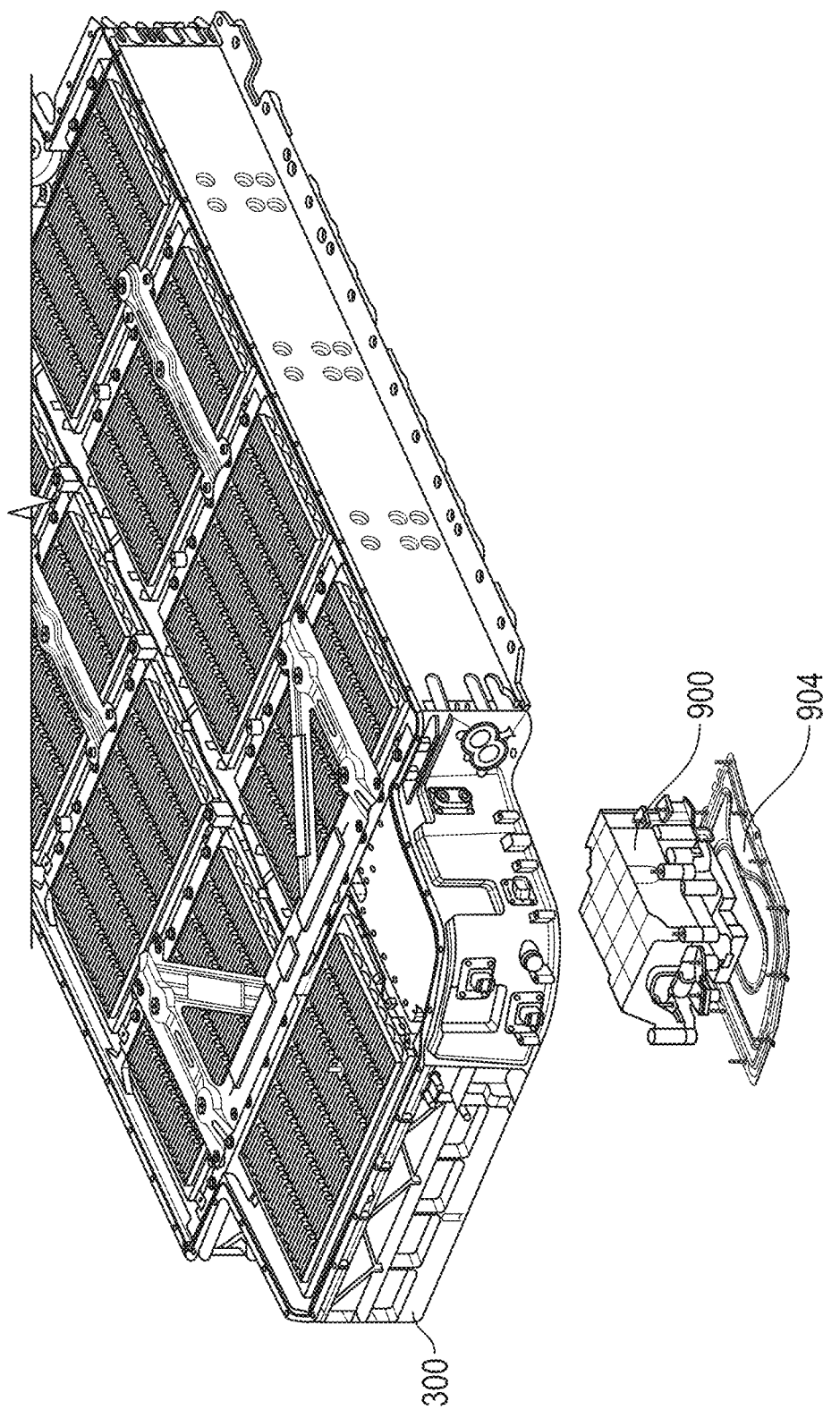
FIG. 10 illustrates a top perspective view of a portion of a battery pack with the enclosure of FIG. 7 and with a high voltage distribution box (HVDB) removed from the battery pack in accordance with one or more implementations.
Figure 11:
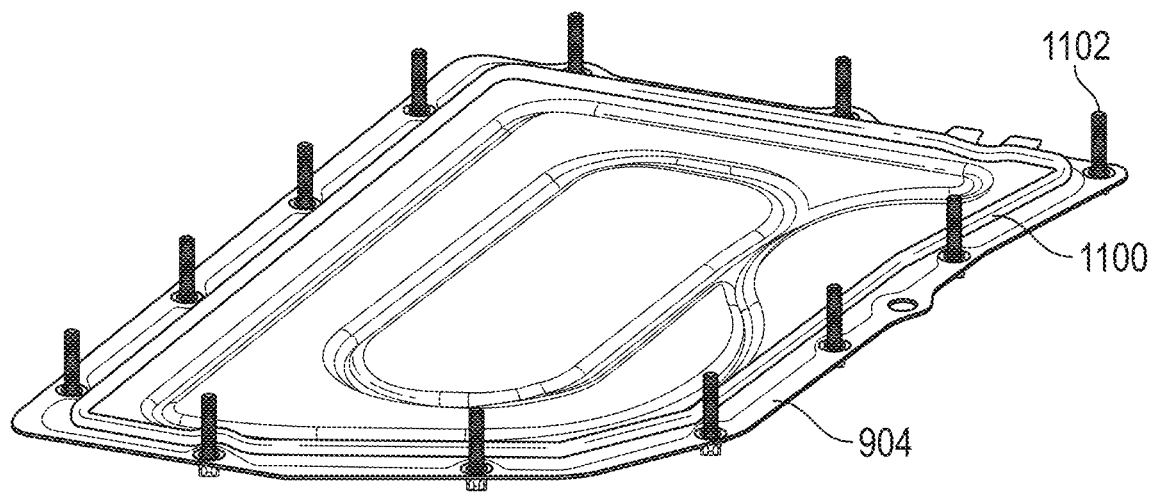
FIG. 11 illustrates a perspective view of a cover plate for an opening in an enclosure for a battery pack in accordance with one or more implementations.
Figure 12:
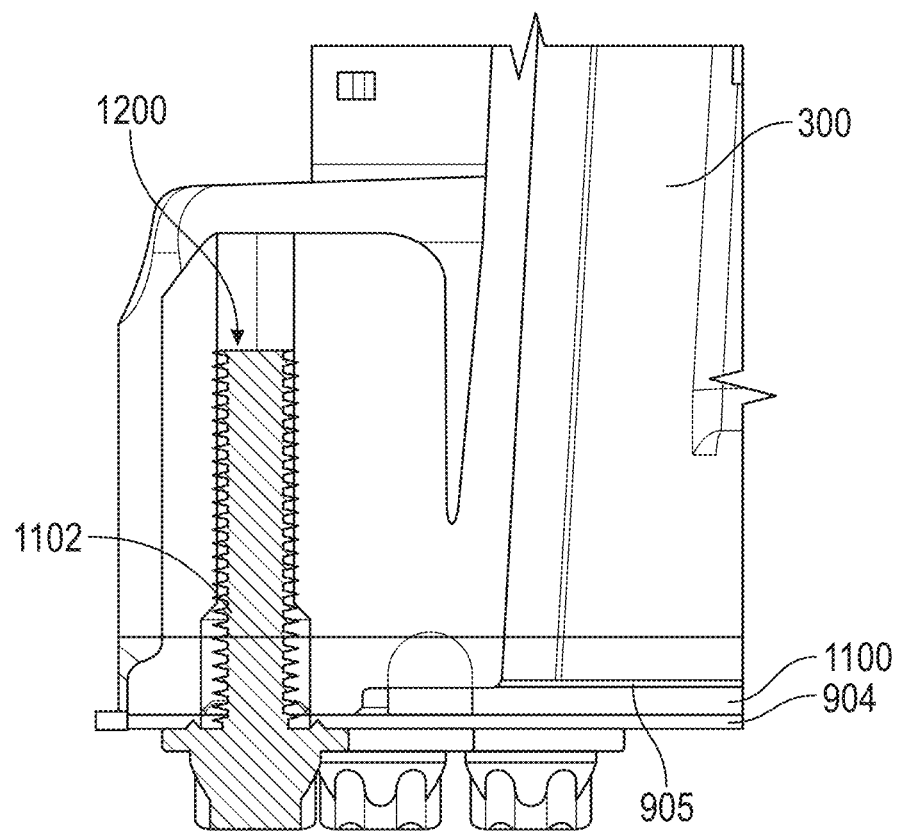
FIG. 12 illustrates a cross-sectional perspective view of a portion of an enclosure for a battery pack in accordance with one or more implementations.

FIGS. 10-12 illustrate additional features and/or views of portions of the battery pack 110 in which the cover plate 904 is completely removable from the enclosure 205. For example, FIG. 10 illustrates a top perspective view of a portion of the battery pack 110 with the high voltage distribution box 900 separate from the battery pack 110 (e.g., prior to installation, and/or after removal for servicing and/or replacement). FIG. 11 illustrates a perspective view of the cover plate 904 in accordance with one or more implementations. As shown in FIG. 11, the cover plate 904 may be provided with a plurality of fasteners 1102 around a periphery thereof. The fasteners 1102 may be arranged to be received in a plurality of corresponding openings in the surface 905 of the casted member 300. For example, the fasteners 1102 may be provided as captive fasteners (e.g., with a push nut on a rear/inside of the cover plate 904 to hold the fasteners in place during installation and/or removal of the cover plate 904). As shown, the cover plate 904 may be provided with a bead of sealing material 1100 around the periphery thereof (e.g., inward of the fasteners 1102). For example, the sealing material 1100 may be a cure-in-place sealing material, and may be dispensed onto the cover plate 904 at a supplier of the cover plate 904 in some implementations.

When the high voltage distribution box 900 is installed in the cavity 311, via the opening 902 in the casted member 300, the sealing material 1100 may be compressed against the surface 905 (see, e.g., FIG. 9) of the casted member 300 to seal the opening 902 and the cavity 311 from the external environment. For example, FIG. 12 illustrates a cross-sectional perspective view of a portion of the enclosure 205 in the vicinity of the cover plate attachment to the casted member 300. As shown, sealing material 1100 may be compressed between the cover plate 904 and the surface 905 of the casted member 300. As shown, the fasteners 1102 may pass through an opening in the cover plate 904 and into a bore hole 1200 (e.g., a blind boss in some implementations) in the casted member 300 to secure the cover plate 904 to the casted member 300. As shown, the bore holes 1200 may include a counterbore for self-aligning the fasteners 1102 (e.g., with a coordinated lid hole diameter).

The examples of FIGS. 9-12 illustrate a battery pack having bottom access to the HVDB 900 in the configuration of, for example, FIG. 6 in which the casted member 300 houses both the HVDB 900 (e.g., in the cavity 311) and a battery module 115 (e.g., in the cavity 600). It is also appreciated that a battery pack may be provided with bottom access to the HVDB 900 in the configuration of, for example, FIG. 5, in which the casted member 300 houses the HVDB 900 (e.g., in the cavity 311) without including space for a battery module 115.

For example, FIG. 13A illustrates a bottom view of a portion of the enclosure 205 in a configuration in which the casted member 300 houses the HVDB 900 (e.g., in the cavity 311) without including space for a battery module 115, and in which the cover plate 904 is a removable cover plate that, when attached to the casted member 300, covers an opening (e.g., opening 902) to a cavity 311 in a casted member (e.g., casted member 300) in which a high-voltage distribution box (not visible in FIG. 13A) can be installed. As shown, the cover plate 904 may be attached to the bottom surface of the casted member 300 using fasteners 1102. In this example, the fasteners 1102 are distributed around the entire periphery of the cover plate 904 (e.g., along each of multiple edges of the cover plate 904).

FIG. 13B illustrates a bottom view of a portion of the enclosure in a configuration in which the casted member 300 houses the HVDB 900 (e.g., in the cavity 311) without including space for a battery module 115, and in which the cover plate 904 is a hingedly openable cover plate that, in the closed configuration of FIG. 13B, covers an opening (e.g., opening 902) to a cavity 311 in a casted member (e.g., casted member 300) in which a high-voltage distribution box (not visible in FIG. 13B) can be installed. In this example, the cover plate 904 is attached to the casted member 300, in part, via a hinge 1331 along one edge of the cover plate 904. FIG. 13C illustrates how the cover plate 904 in the configuration of FIG. 13B can be hingedly opened to expose the opening 902 in the casted member 300 that provides access to the HVDB 900.

Figure 14A:
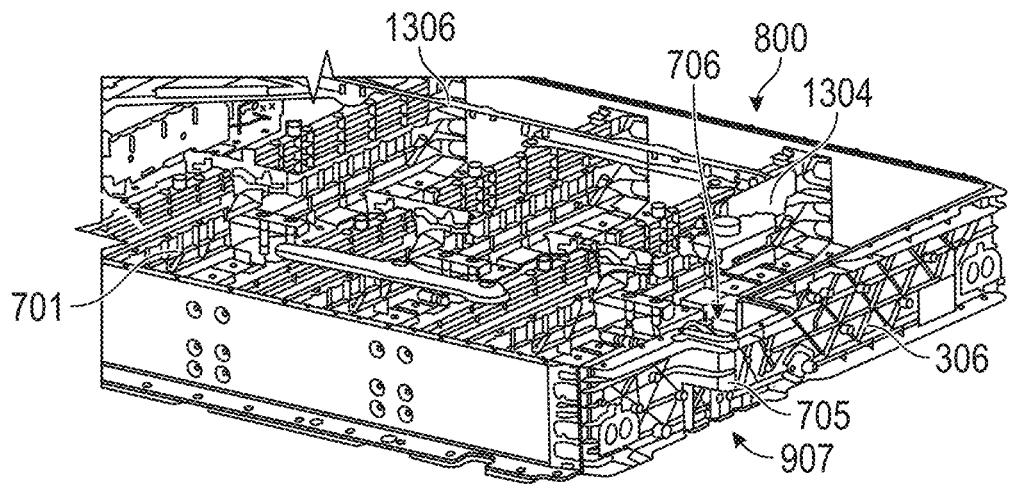
FIG. 14A illustrates a top perspective view of an electrical component being installed in a cavity in a casted member of a battery pack in accordance with one or more implementations.
Figure 14B:
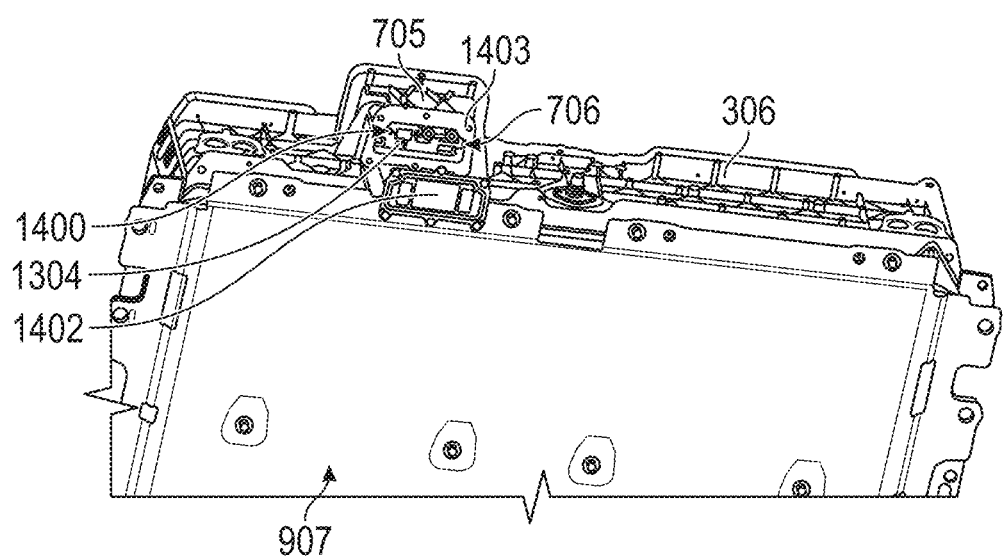
FIG. 14B illustrates a bottom perspective view of a portion of a battery pack with the electrical component of FIG. 14A installed in accordance with one or more implementations.

FIG. 14A illustrates a top perspective view of an electrical component 1304 being installed in the cavity 706 in the casted member 300 in accordance with one or more implementations. As shown, a coupling structure 1306 (e.g., a cable and/or one or more connectors) may extend from the electrical component 1304 (e.g., to connect with one or more of the battery modules 115 and/or a mid-pack disconnect). For example, the electrical component 1304 may be a pyrofuse assembly that can be installed from the top 800 of the battery pack 110 and later accessed from the bottom 907 of the battery pack 110. For example, FIG. 14B illustrates a bottom perspective view of a portion of the battery pack 110 with the electrical component 1304 installed in the cavity 706. In this example, the electrical component 1304 is visible via an opening 1400 in the casted member 306 (e.g., in a bottom surface of the casted member 306) that allows access to the cavity 706 from the bottom 907 of the battery pack 110. As shown, a cover plate 1402 may be provided for the opening 1400. For example, cover plate 1402 may be provided with a bead of sealing material and/or one or more fasteners (e.g., captive fasteners), similarly to the cover plate 904 for the casted member 300, for attaching and sealing the cover plate 1402 to the surface of the casted member 306 and to close and seal the opening 1400 and the cavity 706. For example, the cover plate 904 and the cover plate 1402 may help to reduce or eliminate dropping fasteners in a battery pack during assembly, dropping or losing fasteners during service, and/or seal mis-assembly during installs.

Figure 15:
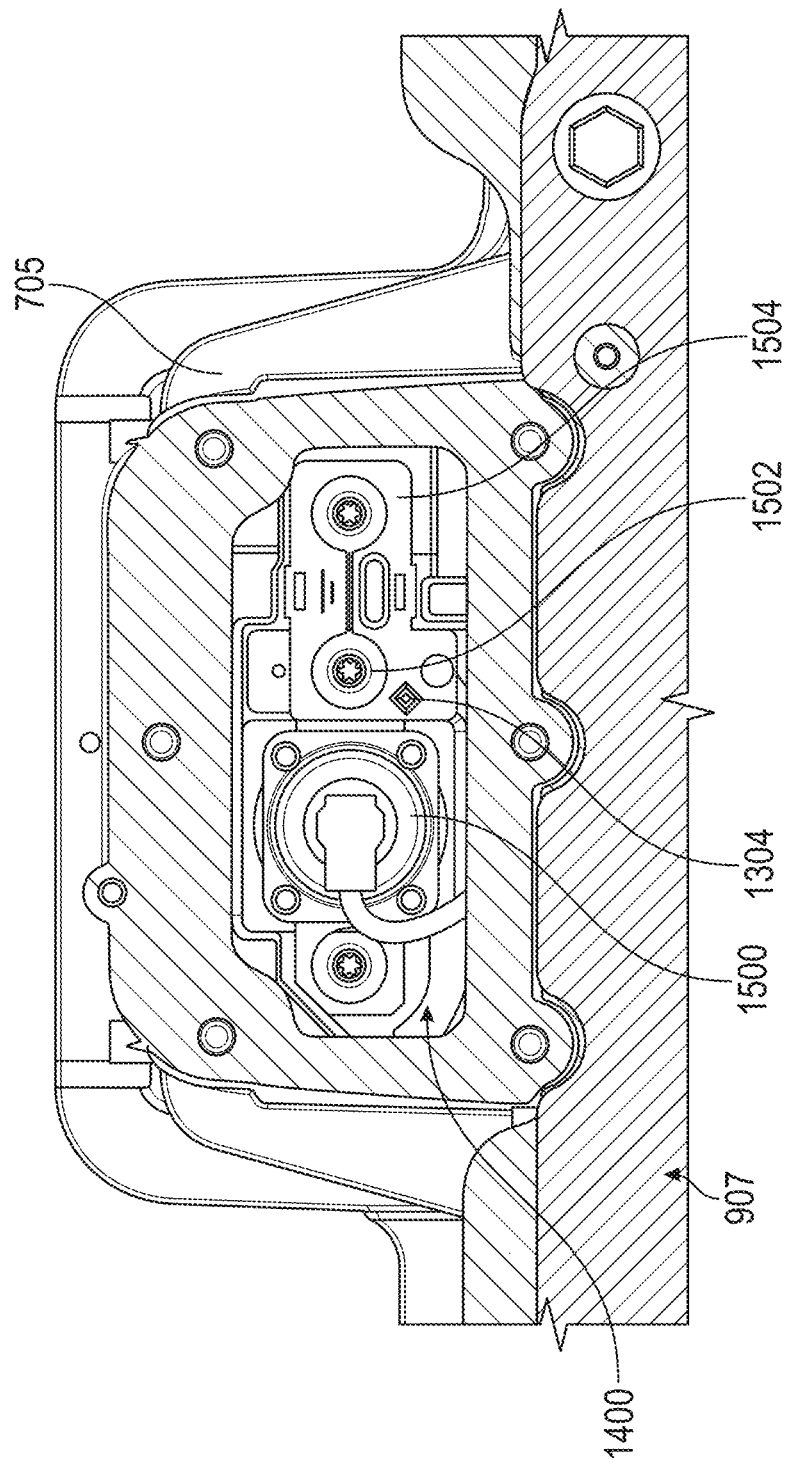
FIG. 15 illustrates a bottom view of a portion of a battery pack with the electrical component of FIG. 14A installed in accordance with one or more implementations.

FIG. 15 illustrates a bottom view of a portion of a battery pack with the electrical component 1304 visible through the opening 1400 in accordance with one or more implementations. As shown, the electrical component 1304 may be a multifunction component that includes, for example, a pyrofuse 1500, one or more probe points 1502 (e.g., for joint verification), and/or a mid-pack disconnect access 1504 (e.g., for breaking the pack voltage). As illustrated by the examples of FIGS. 12-15, a battery pack 110 may be provided with a pyrofuse assembly that can be installed from the top 800, and accessed from the bottom 907, of the battery pack 110. In this way, in, for example, a scenario in which the pyrofuse 1500 is in need of inspection or replacement, access to the probe points 1502 is desired, and/or a mid-pack disconnect is desired, the pyrofuse 1500, the one or more probe points 1502, and/or the mid-pack disconnect access 1504 can be accessed via the opening 1400, and the opening 1400 can be reclosed by reattaching the cover plate 1402 while the battery pack 110 remains attached to the vehicle 100 (e.g., in contrast with removing the entire battery pack 110 from the vehicle 100, and opening the lid to the entire battery pack from the top 800 to access the pyrofuse assembly).

Figure 16:
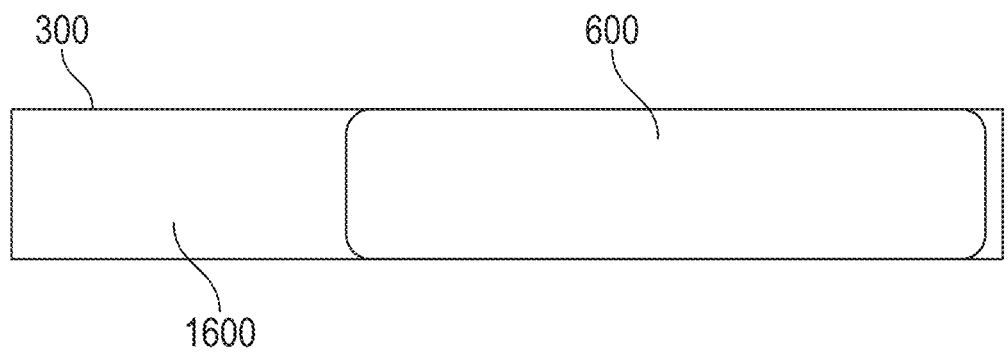
FIG. 16 illustrates a rear view of a casted member of an enclosure for a battery pack in accordance with one or more implementations.
Figure 17:
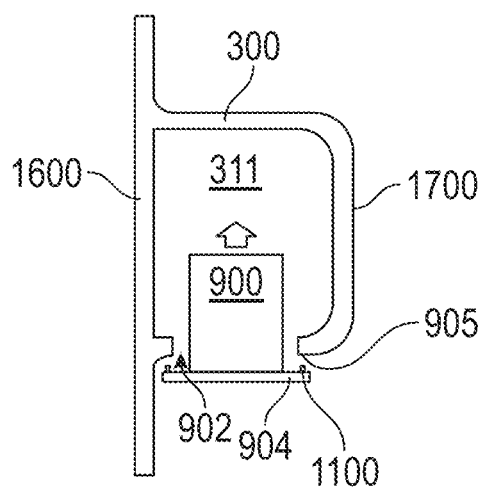
FIG. 17 illustrates a cross-sectional side view of a casted front member of an enclosure for a battery pack in accordance with one or more implementations.

FIG. 16 illustrates a rear view of the casted member 300 in accordance with one or more implementations. In the example of FIG. 16, the casted member 300 includes a rear wall 1600 that faces the cavity 312 of the battery pack 110 when the casted member 300 is attached to the extruded sidewall structures 302 and 304 (and thereby to the casted member 306). In this example, the rear wall 1600 separates the cavity 312 from the cavity 311 that is within the casted member 300. As shown, the rear wall 1600 may be a partial wall and/or may include an opening that extends through to the cavity 600 in the casted member 300. FIG. 17 illustrates a cross-sectional side view of the casted member 300 of FIG. 16, with the cross section passing through the cavity 311 (e.g., in a direction from a front toward the back of the battery pack 110). As shown in FIG. 17, the HVDB 900 may be installed in the cavity 311 formed by the casted member 300 by inserting the HVDB 900 vertically into the cavity 311 through the opening 902 in the casted member 300. The opening 902 and the cavity 311 may then be sealed from the external environment by placing the bead of sealing material 1100 that is on the cover plate 904 in contact with the surface 905 of the casted member 300, and fastening the cover plate 904 to the casted member (e.g., using the fasteners 1102 described in connection with FIGS. 11 and 12). As shown in FIG. 17, the rear wall 1600 and an outer wall 1700 of the casted member 300 may be integrally formed portions of a single unitary casted member 300 that define the cavity 311.

Figure 18:
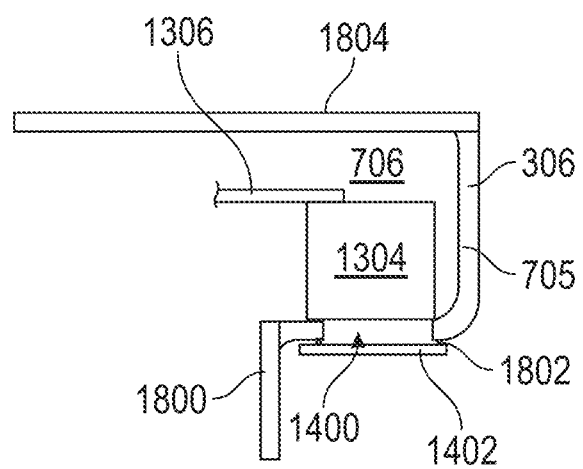
FIG. 18 illustrates a cross-sectional side view of a casted rear member of an enclosure for a battery pack in accordance with one or more implementations.

FIG. 18 illustrates a cross-sectional side view of the casted member 306, with the cross section passing through the cavity 706 (e.g., in a direction from a front toward the back of the battery pack 110). As shown in FIG. 18, the casted member 306 may include an inner wall 1800 and an outer wall formed by the extension 705. The inner wall 1800 may be a partial wall that allows the cavity 706 formed by the extension 705 to be coupled to the cavity 312 of the enclosure 205 (e.g., such that the coupling structure 1306 can extend from the electrical component 1304 to the battery modules 115 external to the cavity 706). A lid 1804 of the enclosure 205 may be attached to the casted member 306 (e.g., and to the casted member 300, the extruded sidewall structure 302, and the extruded sidewall structure 304), and may close a top of the cavity 706 (e.g., and the cavity 312 and the cavity 600) after the electrical component 1304 is installed in the cavity 706. Thereafter, while the lid 1804 is present (e.g., and while the battery pack 110 is installed in a vehicle), the cover plate 1402 that (e.g., with a sealing material 1802) seals opening 1400 may be removed to provide access to the electrical component 1304 via the opening 1400 (e.g., via the bottom 907 of the battery pack 110).

Figure 19:
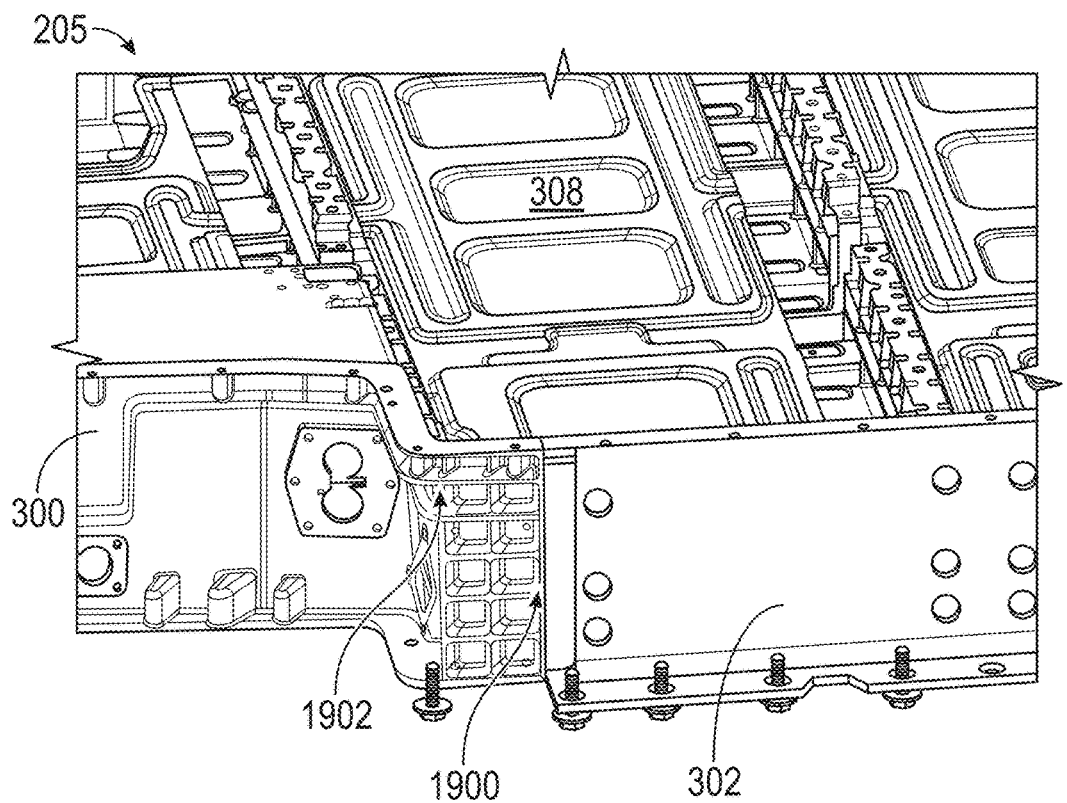
FIG. 19 illustrates a perspective view of a portion of an enclosure for a battery pack at the location of a weld in accordance with one or more implementations.

FIG. 19 illustrates a perspective view of a portion of an enclosure for a battery pack at the location of a weld in accordance with one or more implementations. Providing an enclosure 205 as described herein, with casted members 300 and 306 at the front and rear of the enclosure, may drastically reduce the number of seal paths in the enclosure 205 and the number of parts that form the enclosure 205. For example, FIG. 19 illustrates a seal that may be formed by a weld 1900 (e.g., a spot weld) at the interface between the casted member 300 and the extruded sidewall structure 304. In the configuration of FIG. 18, the casted form of the casted member 300 may provide one, two, three, or more than three surfaces that can accommodate spot welding to the extruded sidewall structure 304 for a reliable seal. Additional seals may be formed by welds (e.g., additional spot welds) at the interface between the casted member 300 and the extruded sidewall structure 302, and at the interfaces between the casted member 306 and the extruded sidewall structures 302 and 304. Because the casted member 300 is a monolithic, unitary structure, the only other seal paths associated with the casted member 300 may be the openings formed therein in the casting process (e.g., using slides during a die casting operation) for fittings, headers, vents, and the like. This can reduce the number of seal paths (e.g., in comparison with an enclosure front end that is formed from multiple parts, such as MIG welded parts) on the front end of the enclosure 205 and on the enclosure 205 overall. For example, the corner features 1902 (e.g., at end portion 313) of the casted member 300 being integrally formed with the casted member 300 (e.g., rather than being separate joined pieces) can help to reduce the number of seal paths on the enclosure 205.

Figure 20:
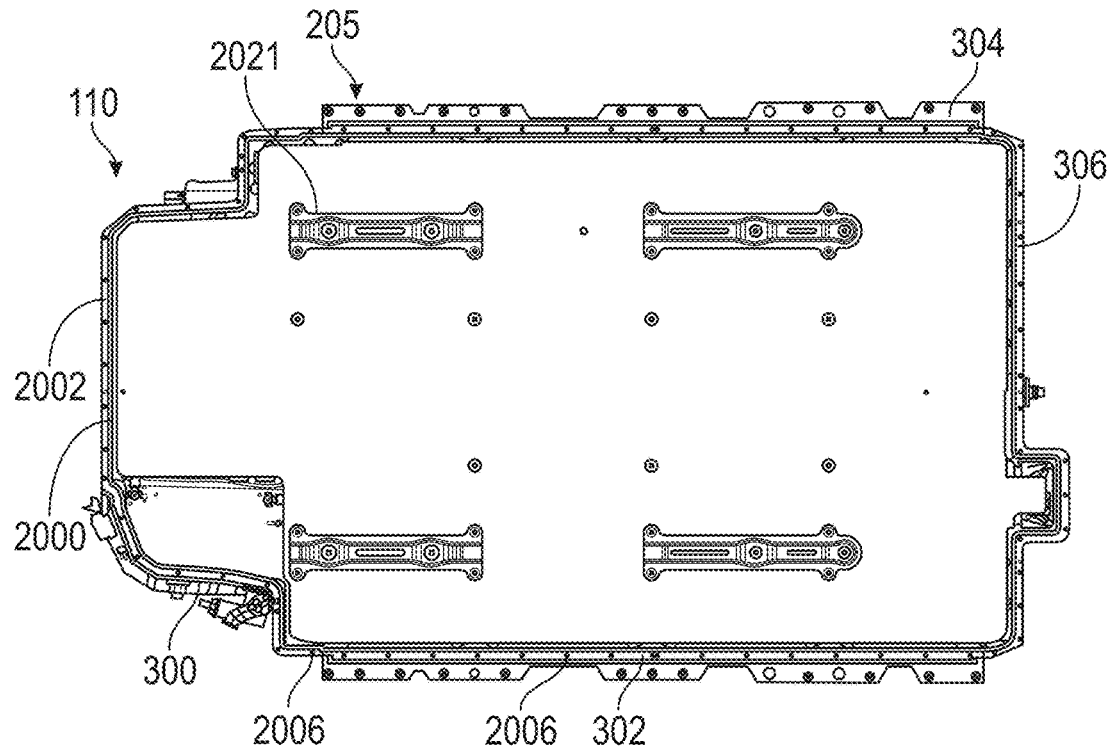
FIG. 20 illustrates a top view of a battery pack with a bead of sealing material for a lid of an enclosure in accordance with one or more implementations.

Seals may also be formed between the bottom plate 308 and the casted member 300, the casted member 306, and the extruded sidewall structures 302 and 304, and between the lid 1804 (see, e.g., FIG. 18) and the casted member 300, the casted member 306, and the extruded sidewall structures 302 and 304. For example, FIG. 20 illustrates a top view of a battery pack 110 with a bead of sealing material 2000 (e.g., a room temperature vulcanizing, or RTV, sealant) for the lid 1804 of the enclosure 205 in accordance with one or more implementations. As shown, the casted member 300, the casted member 306, and the extruded sidewall structures 302 and 304, when welded together, may form a (e.g., substantially) continuous surface 2002 on a top side of the enclosure 205 on which the bead of sealing material 2000 can be (e.g., continuously) formed. In this way, the enclosure 205, formed using casted members 300 and 306, may form a simplified seal bead path (e.g., by providing a continuous surface in a single plane, in comparison with an enclosure having a rim with multiple surfaces at multiple heights with vertical jogs). To close the enclosure 205, the lid 1804 (e.g., having a shape corresponding to the shape of the surface 2002) may be placed on to the bead of sealing material 2000, and fastened to the casted member 300, the casted member 306, and the extruded sidewall structures 302 and 304 (e.g., by fasteners in bore holes 2006 that are formed at locations outward of the sealing material 2000, such as in a "wet zone" of the battery pack 110 that is external to an internal "dry zone" in which the battery modules 115, the HVDB 900, the electrical component 1304 and/or other liquid-sensitive components are enclosed). FIG. 20 also illustrates how the battery pack 110 (e.g., the enclosure 205) may include one or more mounting structures 2021 for mounting one or more seats of a vehicle to the battery pack 110 and/or the enclosure 205.

Figure 21:
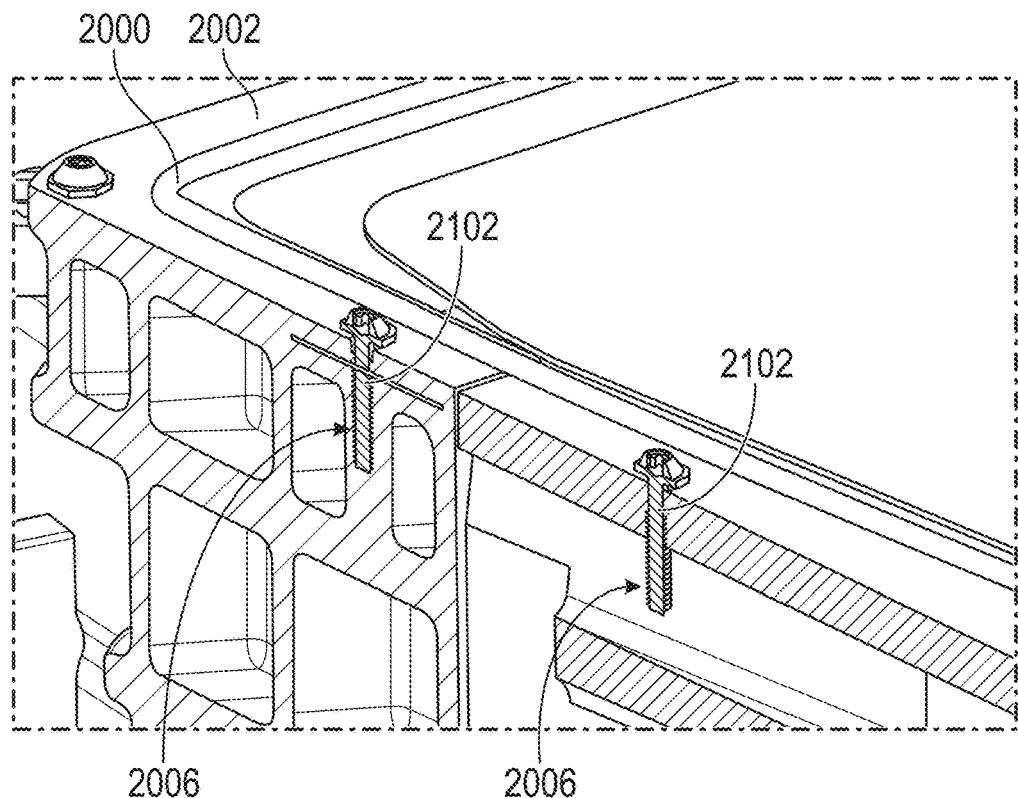
FIG. 21 illustrates a cross-sectional perspective view of a portion of an enclosure for a battery pack at the location of one or more bore holes in accordance with one or more implementations.

For example, FIG. 21 illustrates a cross-sectional perspective view of a portion of the enclosure 205 in which the bore holes 2006 can be seen to be outward of the bead of sealing material 2000. In this way, the bore holes 2006 can be provided for fastening the lid 1804 to the casted member 300, the casted member 306, and the extruded sidewall structures 302 and 304 (e.g., with fasteners 2102 extending therein) without creating any leak paths into the interior (e.g., dry zone) of the enclosure).

Figure 22:
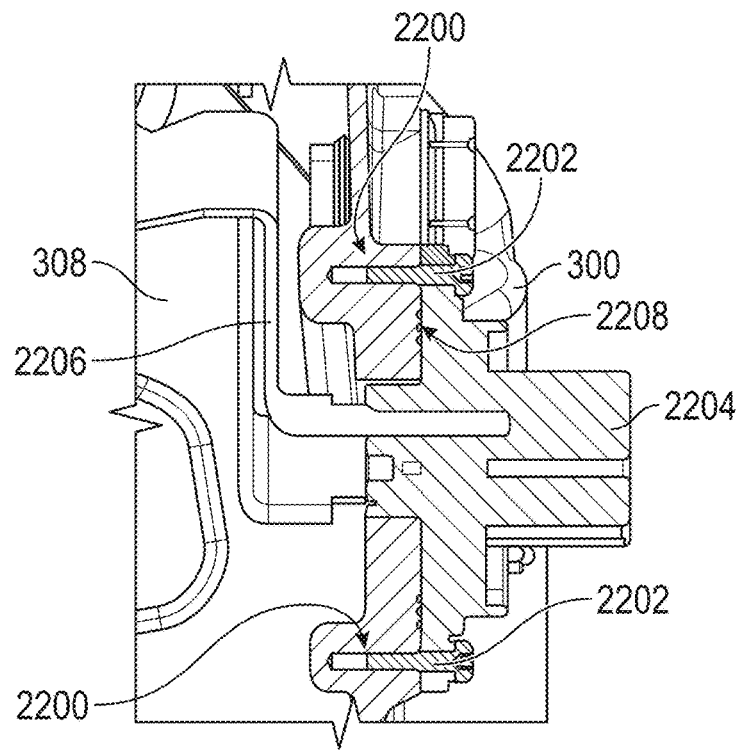
FIG. 22 illustrates a cross-sectional top view of a portion of an enclosure for a battery pack at the location of one or more blind bosses in accordance with one or more implementations.

In one or more implementations, the casted member 300 and/or the casted member 306 may be formed (e.g., using one or more slides during a die casting operation) with one or more blind bosses for fastening headers and/or other components to the battery module 110. For example, FIG. 22 illustrates cross-sectional top view of a portion of the enclosure 205 at the location of a header 2204 mounted in an opening in the casted member 300. As shown, blind bosses 2200 that extend partially into the casted member 300, without extending through the casted member 300 (e.g., without connecting to the interior dry zone of the enclosure), are provided for fastening the header 2204 to the casted member 300 (e.g., using fasteners 2202 that extend into the blind bosses). In this way, headers (e.g., for busbars 2206 and/or other electrical connector and/or probe points) may be attached to the enclosure 205 with a single seal path at the interface 2208 between the header and the casted member 300 (e.g., without creating potential leak paths associated with other fasteners such as rivet nuts through non-casted portions of an enclosure).

Figure 23:
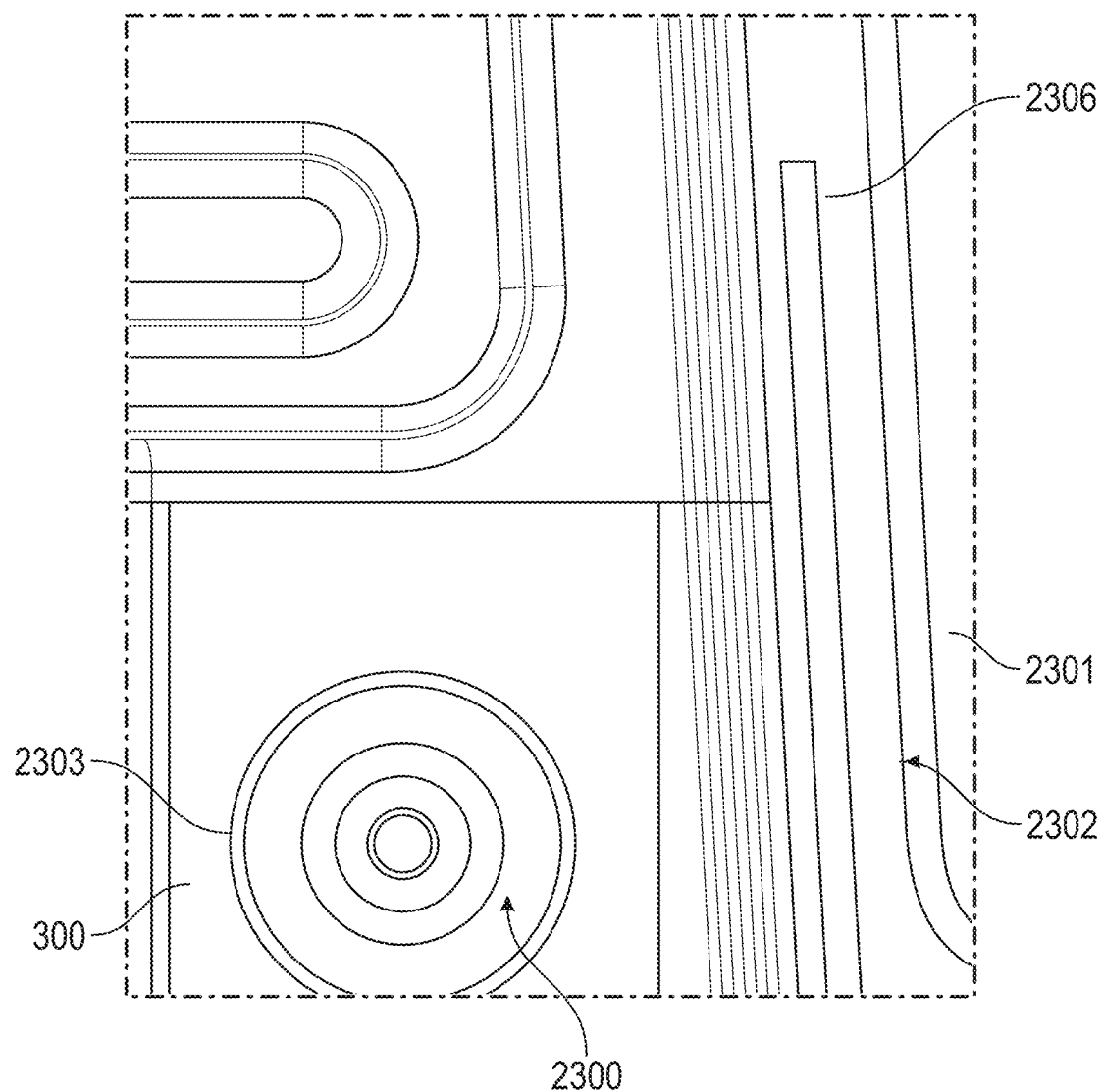
FIG. 23 illustrates a perspective view of a portion of an enclosure for a battery pack at the location of an interface between two housing structures of the enclosure in accordance with one or more implementations.

In one or more implementations, two or more or all of the casted member 300, the casted member 306, the extruded sidewall structures 302 and 304, the lid 1804, and the bottom plate 308 (e.g., and/or the mounting structures 701, 702, and 704), such as are shown in FIG. 7, may be formed from the same material (e.g., aluminum) and/or from materials having the same coefficient of thermal expansion (CTE). In this way, various parts of the enclosure 205 may expand and contract together under changing temperatures (e.g., during a lifetime of a vehicle or other apparatus implementing a battery pack 110), which may reduce the wear on and/or breakdown of the seals within the battery pack 110. For example, FIG. 23 illustrates a portion of the battery pack 110 at the location of an interface between two housing structures of the enclosure in accordance with one or more implementations. In this example, a portion of the casted member 300 is shown with a sealant bead path 2306 disposed between the casted member 300 and an adjacent component 2301 (e.g., a mounting structure 704 and/or a bottom plate 308) that is formed from the same material, or from a material with the same CTE, as the casted member 300. As shown, a bolt hole 2300 may be provided with an adhesive 2303 (e.g., an STR adhesive). In this example, because the casted member 300 and the adjacent component 2301 are formed from the same material, or from the material with the same CTE, the expansion and contraction of the bolt hole 2300 and the perimeter 2302 of the interface with the adjacent component 2301 may be the same (e.g., identical), which may reduce the wear and/or breakdown of the adhesive 2303 and/or the sealant.

As illustrated by the examples of FIGS. 1A-23, in one or more implementations, an apparatus (e.g., vehicle 100, building 180, battery pack 110) may include a casted member 300 for an enclosure 205 for a battery pack 110. The enclosure may include a top 800 configured to be attached to a vehicle 100 and a bottom 907 opposite the top 800. The casted member 300 may include a cavity 311 configured to enclose an electrical component (e.g., HVDB 900 or electrical component 1304) that is electrically coupled to one or more battery cells (120) located within the enclosure and outside the cavity. The casted member may include an opening (e.g., opening 902 or opening 1400) configured to provide access to the electrical component from the bottom of the enclosure.

For example, the electrical component may include a high voltage distribution box (HVDB, 900). The casted member 300 may include a casted front member for the enclosure. As another example, the electrical component may include a pyrofuse. The casted member may include a casted rear member for the enclosure.

The casted member 300 may include a plurality of bore holes 1200 configured to receive a plurality of respective fasteners 1102 for securing a cover plate 904 to the casted member 300 over the opening 902, and an outer surface 905 configured to receive a sealing material 1100 when the cover plate is fastened to the casted member.

As illustrated by the examples of FIGS. 1A-23, in one or more implementations, an apparatus (e.g., vehicle 100, building 180, battery pack 110) may include a casted member 300 for an enclosure 205 for a battery pack 110, the casted member configured to sealingly attach to each of a plurality of housing structures (e.g., extruded sidewall structure 302, extruded sidewall structure 304, and/or bottom plate 308) that combine with the casted member to form the enclosure. The casted member 300 a first end surface 400 that is configured to be sealingly welded to a first sidewall (e.g., extruded sidewall structure 302) for the enclosure, and a second end surface 402 that is configured to be sealingly welded to a second sidewall (e.g., extruded sidewall structure 304) for the enclosure.

The casted member may include a top edge surface (e.g., a portion of the surface 2002) configured to receive a continuous bead of sealing material 2000 for sealing the top edge surface to a lid 1804 for the enclosure. The casted member may include a plurality of blind bosses 2200 configured to receive a plurality of respective fasteners 2202 for fastening external components (e.g., header 2204) to the casted member 300 without forming leak paths into the enclosure 205 at the plurality of respective fasteners 2202.

The casted member may also include a plurality of bore holes 2006 at a plurality of locations each outward of the continuous bead of sealing material 2000, each of the bore holes configured to receive a fastener 2102 for fastening a lid 1804 of the enclosure 205 to the casted member 300. The casted member 300 may be implemented in the enclosure and the continuous bead of sealing material 2000 may run continuously along the top edge surface of the casted member, a top surface of a first sidewall of the enclosure, a top surface of a rear casted member of the enclosure, and a top surface of a second sidewall of the enclosure (e.g., as shown in FIGS. 20 and 21). In one or more implementations, the enclosure 205 is configured (e.g., with mounting structures 2021) to support one or more seats of an electric vehicle 100. In one or more implementations, the casted member 300 may be formed from a first material (e.g., aluminum) having a first coefficient of thermal expansion, and the casted member may be configured to attach to a housing structure (e.g., the extruded sidewall structure 302, the extruded sidewall structure 304, the bottom plate 308, and/or any or all of the mounting structures 701, 702, and/or 704) to form the enclosure 205. The housing structure may be formed from a second material (e.g., aluminum) having the first coefficient of thermal expansion.

Figure 24:
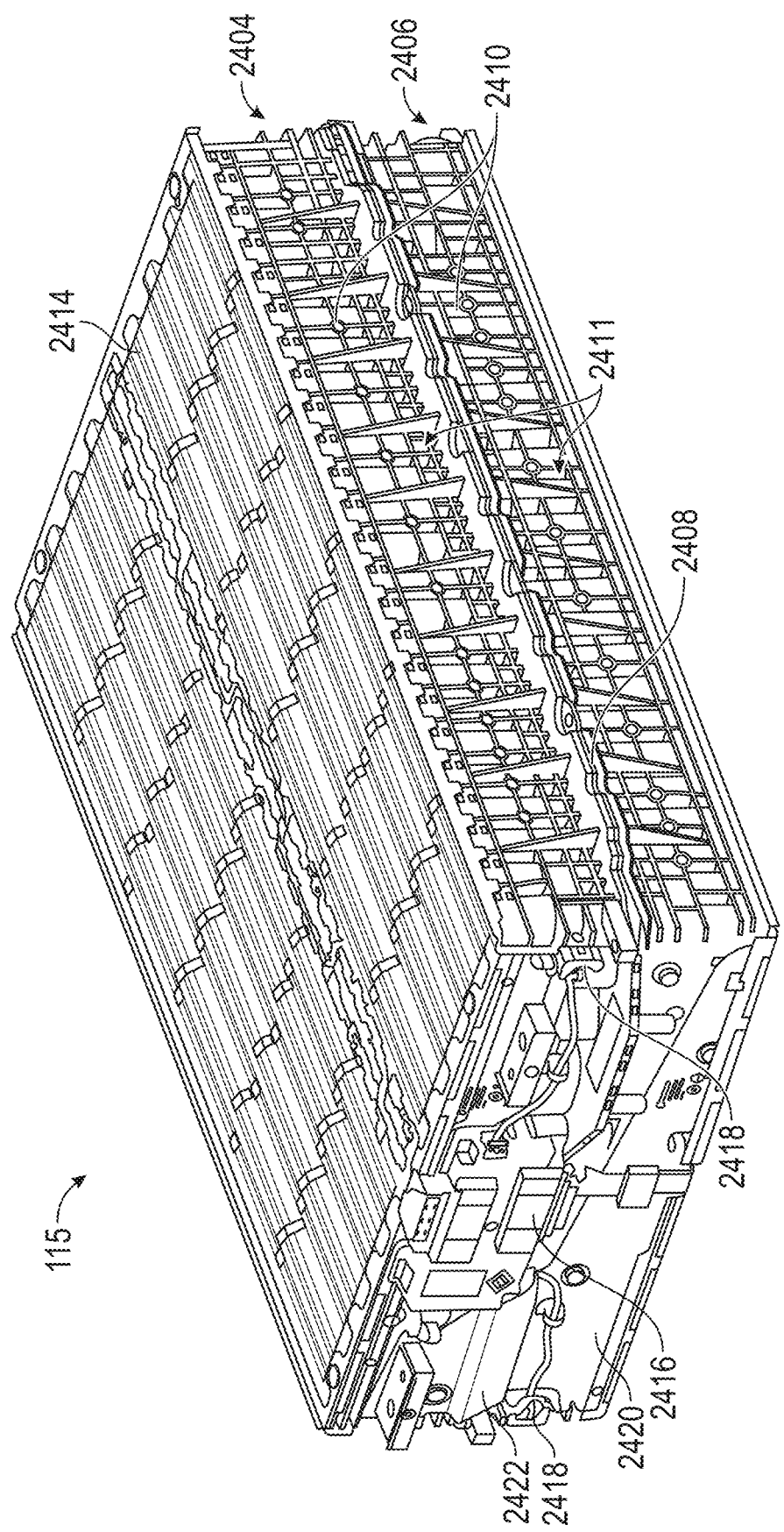
FIG. 24 illustrates a perspective view of a battery module in accordance with one or more implementations.

FIG. 24 illustrates a perspective view of a battery module in accordance with one or more implementations. In the example of FIG. 24, the battery module 115 includes a top submodule 2404 and a bottom submodule 2406. As shown, each of the top submodule 2404 and the bottom submodule 2406 may include a cell carrier 2410. In one or more implementations, each cell carrier 2410 may be a monolithic unitary body (e.g., a molded body formed from plastic and/or other materials), and may include structural features 2411 along the sidewalls thereof. These structural features 2411 may reinforce the strength of the sidewalls of the carrier, and thereby reduce or eliminate the need for additional structural reinforcing components for the battery module 115, such as shear walls attached to the cell carriers 2410. Also visible in FIG. 24 is a cold plate 2408 that is disposed between the top submodule 2404 and the bottom submodule 2406. The cold plate 2408 may be in thermal contact with battery cells (not visible in FIG. 24) in the top submodule 2404 and battery cells (not visible in FIG. 24) in the bottom submodule 2406, to provide thermal control for both the top submodule 2404 and the bottom submodule 2406.

FIG. 24 also illustrates a cover 2414 that may be disposed on a top and/or a bottom of the battery module 115. FIG. 24 also illustrates a balancing voltage and temperature (BVT) module 2416 to which multiple thermistor assemblies 2418 are communicatively coupled. The BVT can be a modular assembly of various electrical components to monitor or control components of the battery subassembly. For example, the BVT can include a circuit board that is attached to the housing of the BVT. The BVT can have various connectors to couple with, for example, a thermistor that can measure a temperature of the battery subassembly, battery module and/or a battery cell thereof, a voltage sensor or balancer that can sense or control voltage that flows through the battery subassembly, battery module and/or a battery cell thereof, or a communication device that can receive, transmit, or analyze data associated with the battery subassembly, battery module and/or a battery cell thereof. Also shown in FIG. 24 are a busbar 2420 (e.g., a positive busbar) that is electrically coupled to first terminals (e.g., the positive terminals) of the battery cells of the top submodule 2404 and the bottom submodule 2406, and a busbar 2422 (e.g., a negative busbar) that is electrically coupled to second terminals (e.g., the negative terminals) of the battery cells of the top submodule 2404 and the bottom submodule 2406.

Figure 25:
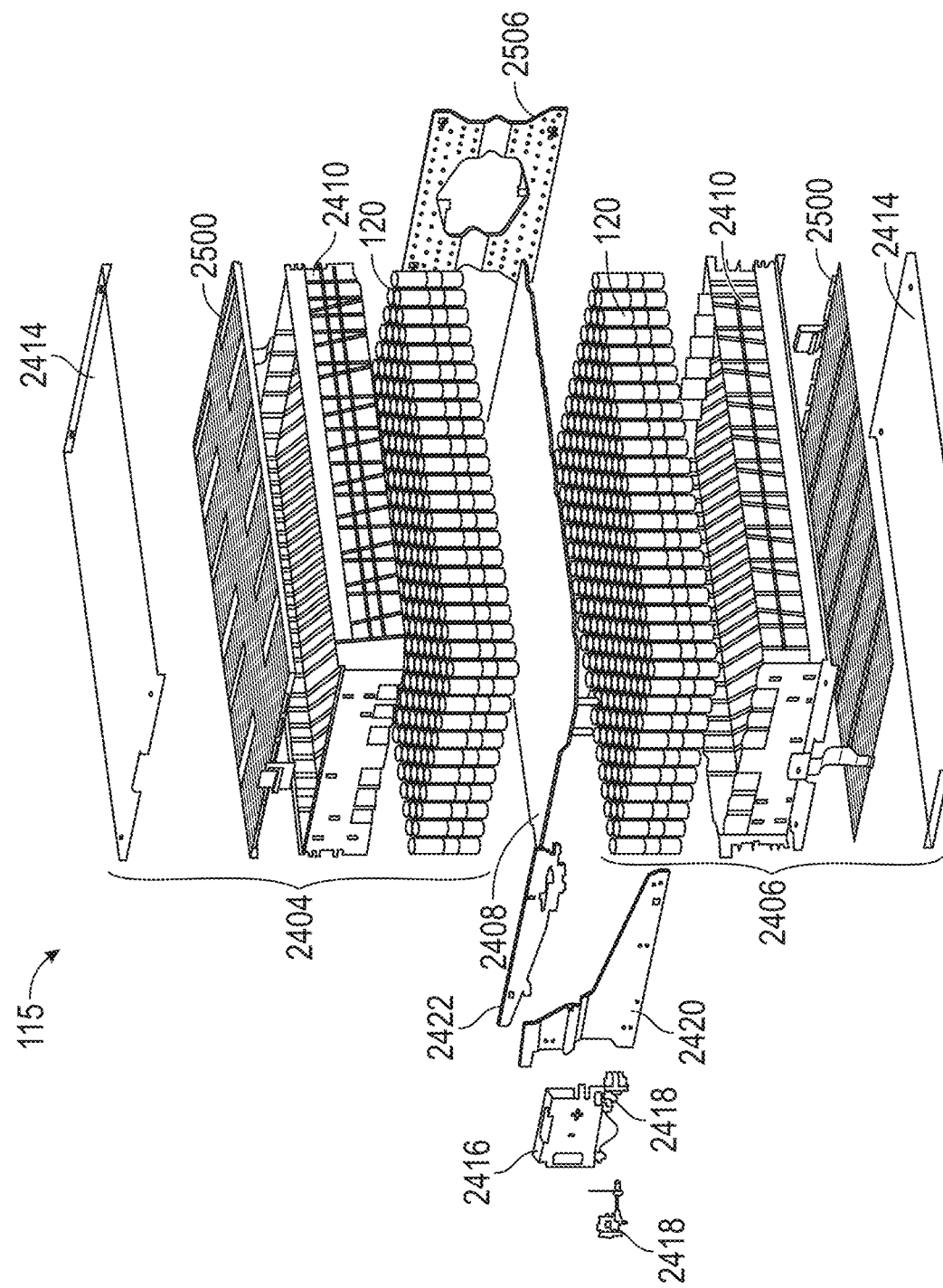
FIG. 25 illustrates an exploded perspective view of the battery module of FIG. 24 in accordance with one or more implementations.

FIG. 25 illustrates an exploded perspective view of the battery module 115 of FIG. 24, in which the battery cells 120 of the top submodule 2404 and the battery cells 120 of the bottom submodule 2406 can be seen. In one or more examples described herein, the battery module 115, a subset of the components of the battery module 115 (e.g., the top submodule 2404, the bottom submodule 2406, and/or another subset of the components of the battery module) shown in FIG. 24 and/or FIG. 25, or any other grouping of battery cells (e.g., including a battery pack that includes multiple battery modules and/or other battery subassemblies) may be referred to as a battery subassembly.

In the example of FIG. 25, two current collector assemblies (CCAs) 2500 are also visible which, when the battery module 115 is assembled, connect the terminals of the battery cells 120 of the top submodule 2404 and the bottom submodule 2406 to the busbar 2420 and the busbar 2422. As shown in FIG. 25, a series busbar 2506 may also be provided (e.g., on an opposing end of the cell carriers 2410 from the end of the cell carriers at which the busbar 2420 and the busbar 2422 are mounted). For example, the series busbar 2506 may electrically couple the battery cells 120 of the top submodule 2404 to the battery cells 120 of the bottom submodule 2406. As shown, a cover 2414 may be provided for the top submodule 2404 and a cover 2414 may be provided for the bottom submodule 2406.

The battery cells 120 of the top submodule 2404 may be inserted into a crate structure formed by the cell carrier 2410 of the top submodule 2404, and the battery cells 120 of the bottom submodule 2406 may be inserted into a crate structure formed by the cell carrier 2410 of the bottom submodule 2406. As shown in FIGS. 24 and 25, the orientation of the cell carrier 2410 and the battery cells 120 of the top submodule 2404 may be substantially opposite (e.g., upside down with respect) to the orientation of the cell carrier 2410 and the battery cells 120 of the bottom submodule 2406. In this way, the single cold plate 2408 can be in thermal contact with the same ends (e.g., bottom ends) of the battery cells 120 of both the top and bottom submodules, and provide substantially symmetric thermal contact with the top and bottom submodules.

Figure 26:
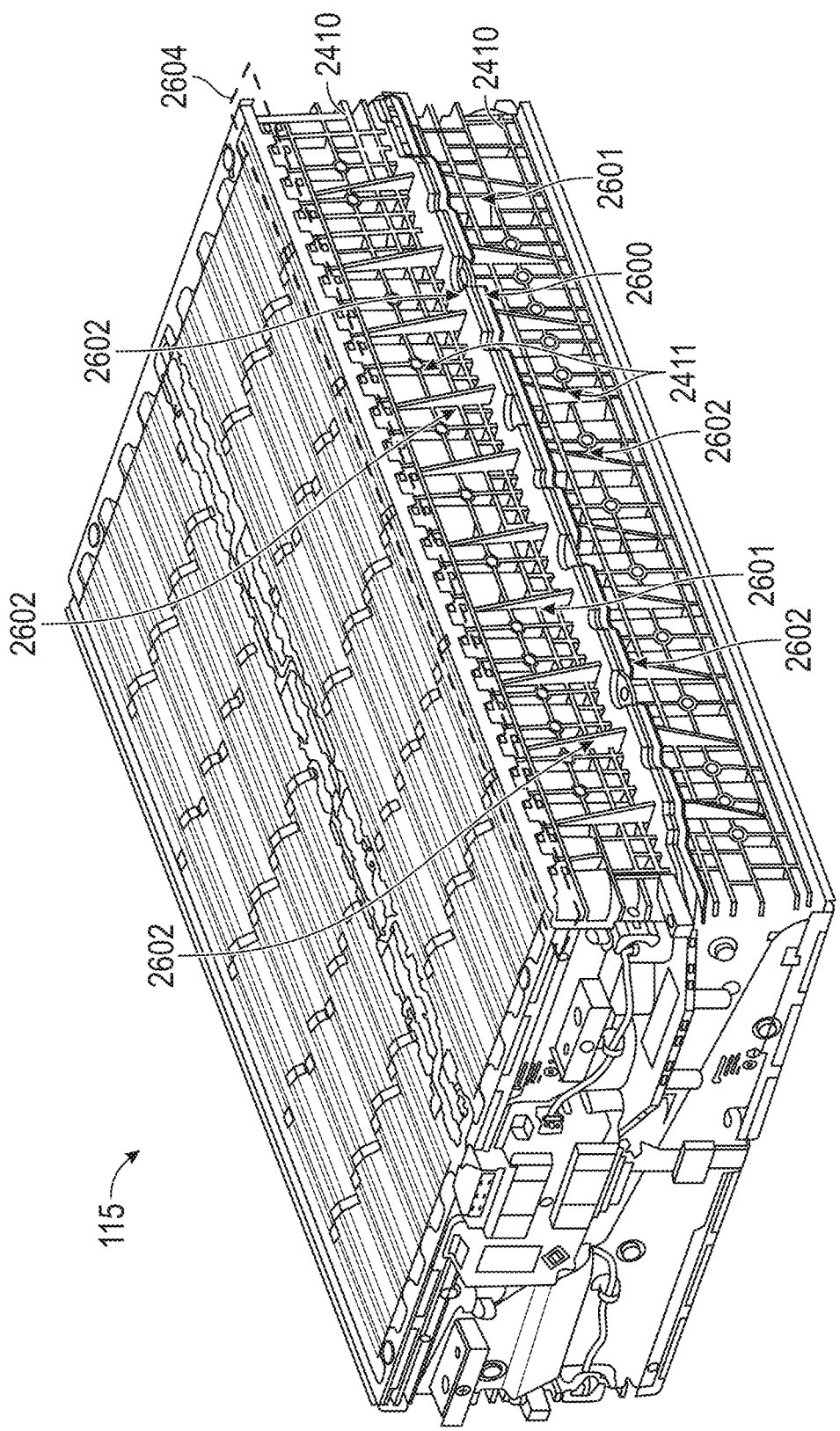
FIG. 26 illustrates a perspective view of a battery module showing features of a cell carrier for a battery module in accordance with one or more implementations.

FIG. 26 illustrates a perspective view a battery module 115 in which various features of the cell carriers 2410 can be seen, in accordance with one or more implementations. In the example of FIG. 26, each cell carrier 2410 (e.g., configured to receive and carry battery cells 120) may include a sidewall 2601. As shown, each of the sidewalls 2601 may include structural features 2411. For example, the structural features 2411 may include ribs 2602 that extend outward from an exterior of the sidewall 2601. For example, ribs 2602 may be configured to distribute at least a portion of an impact force on the cell carrier 2410 (e.g., due to an impact to the battery pack 110, such as due to a vehicle collision) away from the battery cells carried by the cell carrier 2410.

In one or more implementations, the sidewalls 2601 and ribs 2602 of each cell carrier 2410 may be integrally formed parts of a common unitary structure (e.g., the cell carrier 2410). As shown in the example of FIG. 26, one or more of the ribs 2602 may be implemented as a gusset that extends perpendicularly from the sidewall 2601 to a flange 2600 that extends outward from a base of the sidewall 2601 perpendicularly to the sidewall 2601 and to each of the ribs 2602. In one or more implementations, the flange 2600 may be another integrally formed part of the common unitary structure (e.g., the cell carrier 2410).

In the example of FIG. 26, each of the ribs 2602 extends from a corresponding sidewall 2601 to a first distance at a corresponding flange 2600, and tapers, moving vertically away from the corresponding flange 2600, toward the corresponding sidewall 2601.

Figure 27:
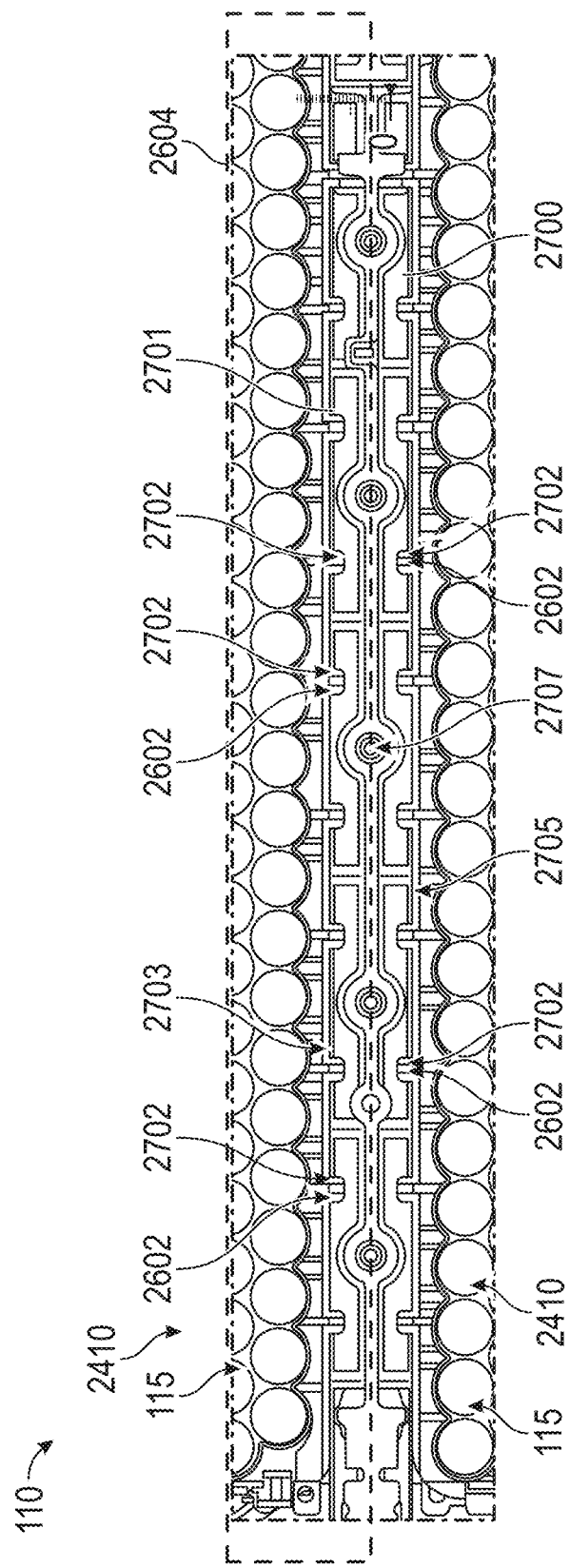
FIG. 27 illustrates a top view of a portion of a battery pack including battery modules in accordance with one or more implementations.

FIG. 27 illustrates a top view of a portion of a battery pack having two battery modules 115 that are laterally (e.g., horizontally) separated from each other (e.g., in adjacent portions 500 and/or 600 of the cavity 312 of the enclosure 205). For example, FIG. 27 may represent a top-down view of a portion of the battery module 115 of FIG. 26 in the dashed box 2604, and a similar portion of another battery module 115.

As shown in FIG. 27, the ribs 2602 on a sidewall 2601 of a cell carrier 2410 may be configured to be received in corresponding notches 2702 in a cross member 2700 disposed between the cell carrier 2410 and another cell carrier 2410. In this arrangement, the ribs 2602 may be configured to distribute at least some of the portion of an impact force to the cross member 2700. In this way, an impact force of an impact to the battery pack and/or battery modules may be redirected away from the battery cells 120 stored in the cell carriers 2410, and absorbed by the cross member 2700. For example, the cross member 2700 may be mounted to one or more of the mounting structures 701, 702, and/or 704 of FIG. 7.

In the examples of FIGS. 26 and 27, only one side of each cell carrier is visible. However, it is appreciated that the sidewalls 2601 shown in FIG. 26 may each be a first sidewall 2601 on a first side of a corresponding cell carrier 2410, each cell carrier 2410 may include a second sidewall 2601 on an opposing second side of the cell carrier 2410, and the second sidewall 2601 may include an additional ribs 2602 that extend outward from an exterior of the second sidewall 2601. For example, in the example of FIG. 27, the ribs 2602 of a first sidewall of one cell carrier 2410 may be opposed to the ribs 2602 of a second sidewall of another cell carrier 2410 (e.g., with the cross member 2700 interposed therebetween).

As shown in FIG. 27, a cross member 2700 for a battery pack 110 may include an elongate main body 2701 and one or more notches 2702 that are configured to receive one or more respective gussets (e.g., ribs 2602) that extend from a sidewall 2601 of a cell carrier 2410 for battery cells 120. For example, the cross member 2700 may be configured to absorb an impact force distributed from respective gussets. For example, the notches 2702 of the cross member 2700 may include a first set of notches 2702 spaced apart along a first elongate edge 2703 of the elongate main body 2701. The notches 2702 of the cross member 2700 may also include a second set of notches 2702 spaced apart along a second elongate edge 2705 of the elongate main body 2701.

As shown in FIG. 27, second set of notches 2702 may be configured to receive a second set of respective gussets (e.g., ribs 2602) that extend from a sidewall 2601 of a second cell carrier 2410 for battery cells. The cross member may be formed from a material including a metal (e.g., an aluminum, or aluminum alloy such as aluminum a380). As shown, the cross member 2700 may also include an one or more attachment features 2707 configured for securing the cross member 2700 (e.g., to one or more in position relative to the cell carrier(s) 2410.

As illustrated by FIGS. 1A, 1B, 24, 25, 26, and 27, in one or more implementations, a battery pack 110 may include a battery module 115 that may include a first cell carrier 2410 configured to receive a first set of battery cells 120, in which the first cell carrier 2410 includes a first sidewall 2601 having a first set of ribs 2602 that extend outward from an exterior of the first sidewall 2601; and a second cell carrier 2410 stacked with the first cell carrier 2410 and configured to receive a second set of battery cells 120, in which the second cell carrier includes a second sidewall 2601, substantially coplanar with the first sidewall 2601 of the first cell carrier 2410, and having a second set of ribs 2602 that extend outward from an exterior of the second sidewall 2601. In this configuration, the first set of ribs 2602 and the second set of ribs 2602 may be configured to distribute at least a portion of an impact force on the battery module 115 away from the first plurality of battery cells or the second plurality of battery cells.

In one or more implementations, the battery pack 110 may also include a cross member 2700 that includes an elongate main body 2701 and a first set of notches 2702 that are configured to receive the first set of ribs 2602 that extend from the first sidewall 2601 of the first cell carrier 2410. The first set of notches 2702 may also be configured to receive the second set of ribs 2602 that extend from the second sidewall 2601 of the second cell carrier 2410 that is stacked with the first cell carrier 2410 in the battery module. In one or more implementations, the cross member 2700 may also include a second set of notches 2702 that are configured to receive a third set of ribs 2602 that extend from a third sidewall of a third cell carrier 2410 (e.g., as in the example of FIG. 27). For example, the third cell carrier 2410 may be a cell carrier of another battery module that is laterally offset with respect to the battery module that includes the first and second cell carriers. The cross member 2700 may be configured to absorb a first part of the impact force distributed from the first plurality of ribs and a second part of the impact force distributed from the second plurality of ribs.

In one or more implementations, a battery pack 110 may include a first cell carrier 2410 for battery cells 120 and a second cell carrier 2410 for the battery cells 120, in which the first cell carrier 2410 includes a first set of ribs 2602 extending from a first sidewall 2601 of the first cell carrier 2410, and in which the second cell carrier 2410 includes a second set of ribs 2602 extending from a second sidewall 2601 of the second cell carrier 2410; and a cross member 2700 disposed between the first cell carrier 2410 and the second cell carrier 2410, the cross member 2700 having a first set of notches 2702 on a first edge 2703 of the cross member that receive the first set of ribs and 2602 and a second set of notches 2702 on a second edge 2705 of the cross member that receive the second set of ribs 2602.

As illustrated by FIGS. 1A, 1B, 24, 25, 26, and 27, in one or more implementations, an apparatus (e.g., vehicle 100, building 180, battery pack 110) may include a cell carrier 2410 configured to receive a plurality of battery cells 120. The cell carrier 2410 may include at least one sidewall 2601 having a plurality of ribs 2602 that extend outward from an exterior of the at least one sidewall. The plurality of ribs may be configured to distribute at least a portion of an impact force on the cell carrier away from the plurality of battery cells.

The at least one sidewall 2601 and the plurality of ribs 2602 may be integrally formed parts of a common unitary structure. Each of the plurality of ribs 2602 may include or form a gusset that extends perpendicularly from the at least one sidewall 2601 to a flange 2600 that extends outward from a base of the at least one sidewall 2601 perpendicularly to the at least one sidewall 2601 and to each of the plurality of ribs 2602. Each of the plurality of ribs 2602 extends from the at least one sidewall 2601 to a first distance at the flange 2600, and tapers, moving vertically away from the flange 2600, toward the at least one sidewall 2601. The plurality of ribs 2602 may be are configured to be received by a plurality of corresponding notches 2702 in a cross member 2700 disposed between the cell carrier 2410 and another cell carrier 2410, and to distribute at least some of the portion of the impact force to the cross member 2700. For example, the cell carrier 2410 may be implemented in a battery subassembly (e.g., battery pack 110) in a vehicle (e.g., vehicle 100).

Figure 28:
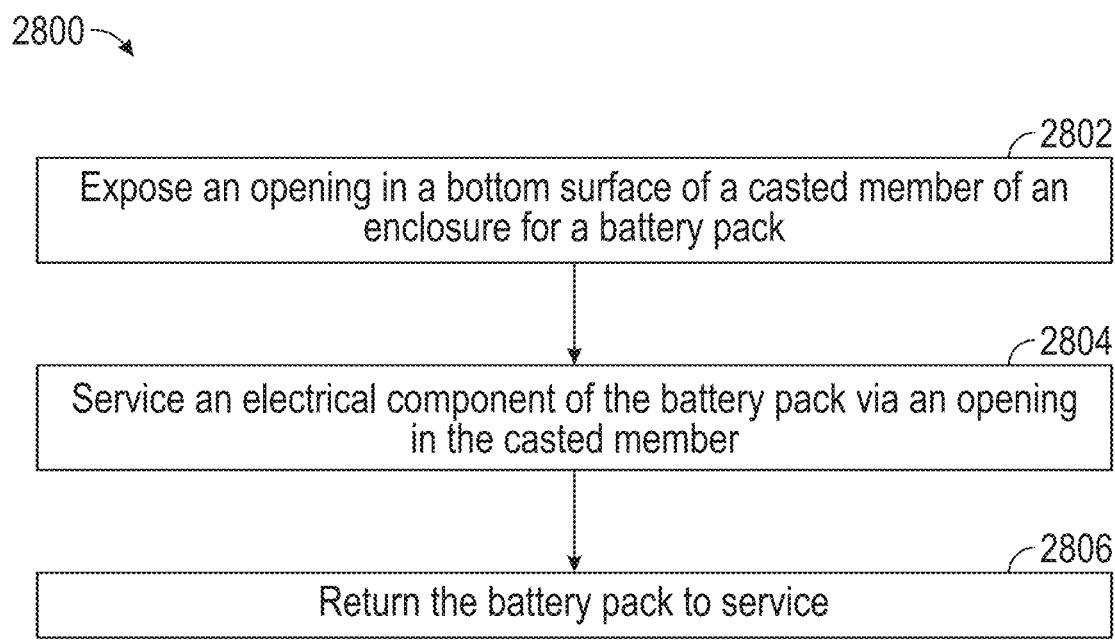
FIG. 28 is a flow chart of illustrative operations that may be performed for servicing a battery pack in accordance with one or more implementations.

FIG. 28 illustrates a flow diagram of an example process 2800 that may be used for servicing a battery pack, in accordance with implementations of the subject technology. For explanatory purposes, the process 2800 is primarily described herein with reference to the battery pack 110 of FIGS. 1A-2A. However, the process 2800 is not limited to the battery pack 110 of FIGS. 1A-2A, and one or more blocks (or operations) of the process 2800 may be performed by one or more other structural components of other suitable moveable apparatuses, devices, or systems. Further for explanatory purposes, some of the blocks of the process 2800 are described herein as occurring in serial, or linearly. However, multiple blocks of the process 2800 may occur in parallel. In addition, the blocks of the process 2800 need not be performed in the order shown and/or one or more blocks of the process 2800 need not be performed and/or can be replaced by other operations.

As illustrated in FIG. 28, at block 2802, an opening (e.g., opening 902) in a bottom surface (e.g., surface 905 or surface 1403) of a casted member (e.g., casted member 300 or casted member 306) of an enclosure (e.g., enclosure 205) for a battery pack (e.g., enclosure 205) may be exposed. For example, exposing the opening may include removing or hingedly opening a cover plate (e.g., cover plate 904 or cover plate 1402), such as by removing a plurality of fasteners (e.g., fasteners 1102) along one or more edges of the cover plate, and breaking a seal (e.g., sealing material 1100) between the cover plate and the bottom surface. The cover plate may be removed or hingedly opened while the battery pack remains installed in a vehicle or other apparatus.

At block 2804, an electrical component (e.g., HVDB 900, or electrical component 1304) of the battery pack may be serviced via the opening (e.g., opening 902 or opening 1400) in the casted member (e.g., the opening exposed by removing or hingedly opening the cover plate). Servicing the electrical component may include replacing the electrical component with a replacement electrical component, repairing the electrical component, or accessing, activating, repairing, and/or replacing another electrical component via the electrical component). The electrical component may be serviced while the battery pack remains installed in a vehicle or other apparatus.

In one or more implementations, the cover plate may be replaced or hingedly closed on the bottom surface of the casted member. For example, replacing or hingedly closing the cover plate may include applying a bead of sealing material between the cover plate and the bottom surface of the casted member, and fastening one or more edges of the cover plate to the casted member with the sealing material therebetween. As another example, replacing or hingedly closing the cover plate may include fastening the cover plate to the casted member with a previously applied sealing material therebetween.

At block 2806, the battery pack may be returned to service (e.g., without having removed the battery pack from a vehicle or other apparatus in which the battery pack is installed). For example, returning the battery pack to service may include reconnecting a terminal (e.g., a high voltage terminal) of the battery pack to a load, such as a vehicle or other apparatus.

Figure 29:
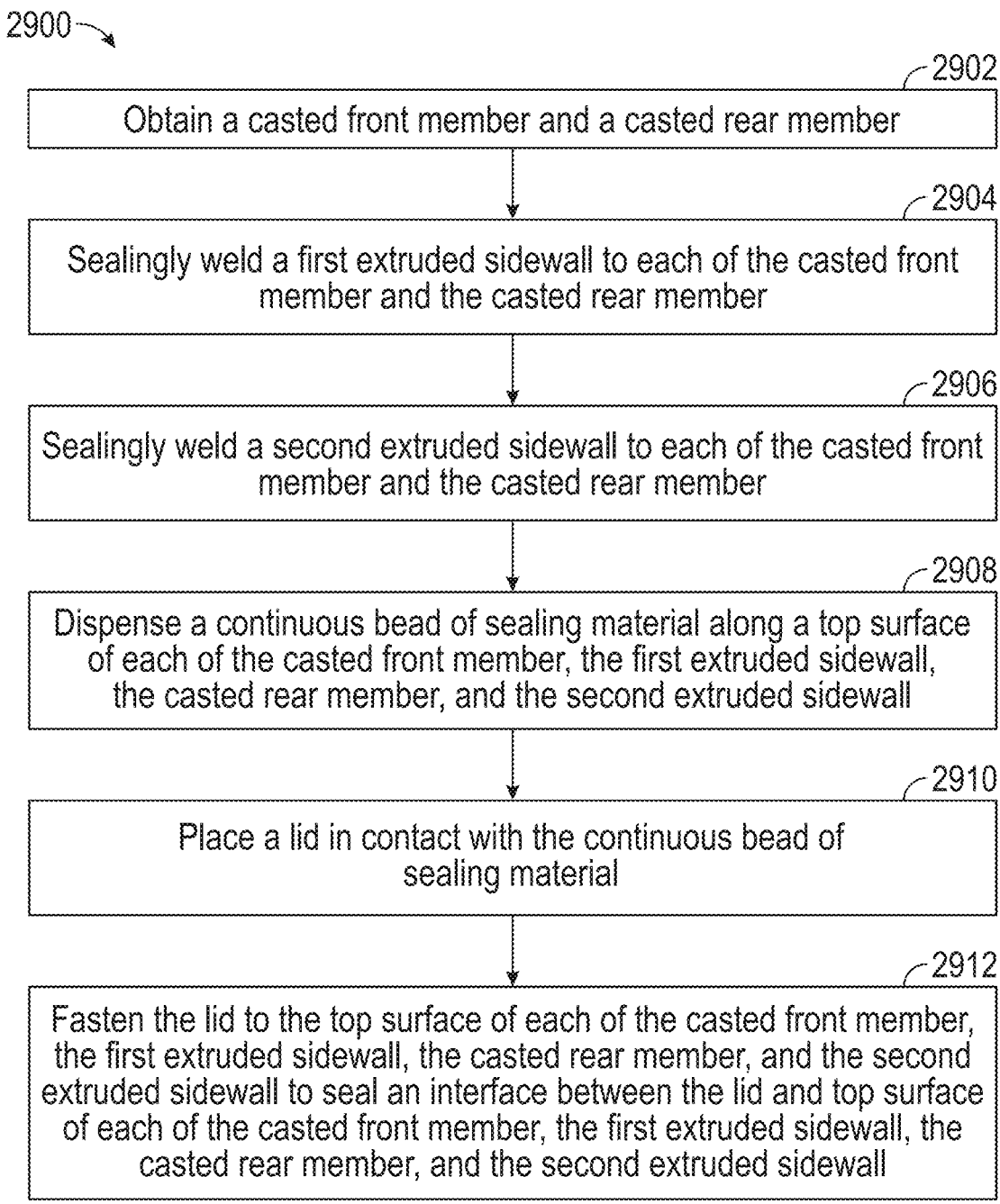
FIG. 29 is a flow chart of illustrative operations that may be performed for assembling an enclosure for a battery pack in accordance with one or more implementations.

FIG. 29 illustrates a flow diagram of an example process 2900 that may be performed for assembling a battery pack or an enclosure therefor, in accordance with implementations of the subject technology. For explanatory purposes, the process 2900 is primarily described herein with reference to the enclosure 205 of FIGS. 2A and 3-23. However, the process 2900 is not limited to the enclosure 205 of FIGS. 2A and 3-23, and one or more blocks (or operations) of the process 2900 may be performed by one or more other structural components of other suitable moveable apparatuses, devices, or systems. Further for explanatory purposes, some of the blocks of the process 2900 are described herein as occurring in serial, or linearly. However, multiple blocks of the process 2900 may occur in parallel. In addition, the blocks of the process 2900 need not be performed in the order shown and/or one or more blocks of the process 2900 need not be performed and/or can be replaced by other operations.

As illustrated in FIG. 29, at block 2902, a casted front member (e.g., casted member 300) and a casted rear member (e.g., casted member 306) may be obtained. Obtaining the casted member may include forming the casted member in a casting process, or obtaining a previously casted member.

At block 2904, a first extruded sidewall (e.g., extruded sidewall structure 302) may be sealingly welded (e.g., via spot welding) to each of the casted front member and the casted rear member (e.g., to a first end 400 of the casted front member and a first end 408 of the casted rear member).

At block 2906, a second extruded sidewall (e.g., extruded sidewall structure 304) may be sealingly welded (e.g., via spot welding) to each of the casted front member and the casted rear member (e.g., to a second end 402 of the casted front member and a second end 410 of the casted rear member). Sealingly welding the second extruded sidewall to each of the casted front member and the casted rear member may attach the casted from member to the casted rear member via the first and second extruded sidewalls. In one or more implementations, a bottom plate (e.g., bottom plate 308) may be sealingly attached (e.g., welded or fastened) to the casted front member, the casted rear member, and the first and second extruded sidewalls.

At block 2908, a continuous bead of sealing material (e.g., sealing material 2000) may be dispensed along a top surface of each of the casted front member, the first extruded sidewall, the casted rear member, and the second extruded sidewall. For example, the top surface of each of the casted front member, the first extruded sidewall, the casted rear member, and the second extruded sidewall may be formed in a common plane (e.g., may form a common surface 2002 without vertical jogs).

At block 2910, a lid (e.g., lid 1804) may be placed in contact with the continuous bead of sealing material. The lid may have a shape that corresponds to the shape of the combined top surface of the casted front member, the first extruded sidewall, the casted rear member, and the second extruded sidewall.

At block 2912, the lid may be fastened to the top surface of one or more (e.g., each) of the casted front member, the first extruded sidewall, the casted rear member, and the second extruded sidewall to seal an interface between the lid and top surface of each of the casted front member, the first extruded sidewall, the casted rear member, and the second extruded sidewall. For example, fastening the lid to the top surface of each of the casted front member, the first extruded sidewall, the casted rear member, and the second extruded sidewall may include fastening the lid using fasteners that extend into bore holes (e.g., bore holes 2006) that are located outward of the bead of sealing material.

FIG. 30 illustrates a flow diagram of an example process 3000 that may be performed for assembling a battery module, in accordance with implementations of the subject technology. For explanatory purposes, the process 3000 is primarily described herein with reference to the battery module 115 of FIGS. 1A-1C, 2B, and 24-27. However, the process 3000 is not limited to the battery module 115 of FIGS. 1A-1C, 2B, and 24-27, and one or more blocks (or operations) of the process 3000 may be performed by one or more other structural components of other suitable moveable apparatuses, devices, or systems. Further for explanatory purposes, some of the blocks of the process 3000 are described herein as occurring in serial, or linearly. However, multiple blocks of the process 3000 may occur in parallel. In addition, the blocks of the process 3000 need not be performed in the order shown and/or one or more blocks of the process 3000 need not be performed and/or can be replaced by other operations.

As illustrated in FIG. 30, at block 3002, a first cell carrier (e.g., a first cell carrier 2410) for battery cells (e.g., battery cells 120) and a second cell carrier (e.g., a second cell carrier 2410) for the battery cells may be obtained. The first cell carrier may include a first plurality of ribs (e.g., ribs 2602) extending from a first sidewall (e.g., sidewall 2601) of the first cell carrier, and the second cell carrier may include a second plurality of ribs (e.g., ribs 2602) extending from a second sidewall (e.g., sidewall 2601) of the second cell carrier.

At block 3004, the first cell carrier and the second cell carrier may be arranged such that the first plurality of ribs extend toward the second plurality of ribs. For example, the first cell carrier and the second cell carrier may be placed side-by-side and/or laterally separated from each other. For example, the first cell carrier and the second cell carrier may be arranged in portions 500 of the cavity 312 and/or in the cavity 600 of the enclosure 205.

At block 3006, a cross member (e.g., cross member 2700) may be placed between the first cell carrier and the second cell carrier (e.g., and attached to a mounting structure 701, 702, or 704), such that a first plurality of notches (e.g., notches 2702) on a first edge of the cross member receive the first plurality of ribs and a second plurality of notches (e.g., notches 2702) on a second edge of the cross member receive the second plurality of ribs.

FIG. 31 illustrates a flow diagram of an example process 3100 that may be performed for impact mitigation for a vehicle, in accordance with implementations of the subject technology. For explanatory purposes, the process 3100 is primarily described herein with reference to the vehicle 100 or FIGS. 1A and 1B, and the battery module 115 of FIGS. 1A-1C, 2B, and 24-27. However, the process 3100 is not limited to the vehicle 100 or FIGS. 1A and 1B, and the battery module 115 of FIGS. 1A-1C, 2B, and 24-27, and one or more blocks (or operations) of the process 3100 may be performed by one or more other structural components of other suitable moveable apparatuses, devices, or systems. Further for explanatory purposes, some of the blocks of the process 3100 are described herein as occurring in serial, or linearly. However, multiple blocks of the process 3100 may occur in parallel. In addition, the blocks of the process 3100 need not be performed in the order shown and/or one or more blocks of the process 3100 need not be performed and/or can be replaced by other operations.

As illustrated in FIG. 31, at block 3102, an impact to a body of a vehicle (e.g., vehicle 100) may be received. The vehicle may include a battery pack (e.g., battery pack 110) that includes a cell carrier (e.g., cell carrier 2410) having a plurality of gussets (e.g., ribs 2602) that extend from a sidewall (e.g., sidewall 2601) thereof.

At block 3104, the plurality of gussets (e.g., ribs 2602) may distribute at least a portion of a force of the impact away from a plurality of battery cells in the cell carrier and to a cross member (e.g., cross member 2700) having a plurality of notches (e.g., notches 2702) in which the plurality of gussets are disposed.

Aspects of the subject technology can help improve the serviceability, reliability, manufacturability, and/or proliferation of electric vehicles, which can positively impact the climate by reducing greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus, comprising:
    a casted member for an enclosure for a battery pack, the enclosure comprising a top configured to be attached to a vehicle and a bottom opposite the top, wherein the casted member comprises:
        a first opening configured to receive a pressure release valve and a second opening configured to receive a drive unit connector for a vehicle;
        a first cavity configured to enclose an electrical component that is electrically coupled to one or more battery cells located within the enclosure and outside the cavity;
        a third opening configured to provide access to the electrical component from the bottom of the enclosure;
        a front wall that defines in part the first cavity;
        a first end portion and a second end portion, wherein the first end portion and the second end portion bend from the front wall to form a first portion and a second portion, respectively, of the enclosure, and the first end portion and the second end portion are configured to be attached to a respective sidewall of the enclosure;
        a second cavity configured to carry a battery module of the battery pack; and
        an integral wall that covers the first cavity and separates the first cavity from the second cavity.

2. The apparatus of claim 1, wherein the electrical component comprises a high voltage distribution box in the cavity, and wherein the casted member further comprises a second cavity configured to receive a plurality of additional battery cells.

3. The apparatus of claim 2, wherein the casted member comprises a casted front member for the enclosure and is connectable to a plurality of additional housing structures that combine with the casted member to form the enclosure.

4. The apparatus of claim 1, wherein the electrical component comprises a pyrofuse that is configured to be electrically coupled to the one or more battery cells located within the enclosure and outside the cavity.

5. The apparatus of claim 4, wherein the casted member comprises a casted rear member for the enclosure and is connectable to a plurality of additional housing structures that combine with the casted member to form the enclosure.

6. The apparatus of claim 1, wherein the casted member comprises:
   a plurality of bore holes configured to receive a plurality of respective fasteners for securing a cover plate to the casted member over the third opening, the cover plate being removable and/or hingedly openable to expose the third opening; and
   an outer surface configured to receive a sealing material when the cover plate is fastened to the casted member.

7. The apparatus of claim 1, wherein the front wall defines the first cavity and the second cavity.

8. The apparatus of claim 1, wherein the casted member is attached to the bottom.

9. The apparatus of claim 1, wherein the casted member forms a mounting structure for the battery module in the second cavity.

10. The apparatus of claim 1, further comprising a second casted member, wherein the casted member and the second casted member are separated by sidewall structures of the enclosure.

* * * * *